US012763949B2

(12) United States Patent
Lutsay et al.

(10) Patent No.: US 12,763,949 B2
(45) Date of Patent: Oct. 13, 2026

(54) DATA ENCRYPTION SYSTEM AND METHOD

(71) Applicant: Ostrean IT Technologies s.r.o., Prague (CZ)

(72) Inventors: Grygoriy Lutsay, Cabrils (ES); Mikhail Halai, Vilnius (LT); Alexey Amelenkov, Pavia (IT); Oleksandr Malinin, Kyiv (UA)

(73) Assignee: OSTREAN IT TECHNOLOGIES S.R.O., Prague (CZ)

( * ) Notice: Subject to any disclaimer, the term of this patent is extended or adjusted under 35 U.S.C. 154(b) by 0 days.

(21) Appl. No.: 18/996,237

(22) PCT Filed: Jul. 28, 2023

(86) PCT No.: PCT/CZ2023/050045
§ 371 (c)(1),
(2) Date: Jan. 17, 2025

(87) PCT Pub. No.: WO2024/032833
PCT Pub. Date: Feb. 15, 2024

(65) Prior Publication Data
US 2026/0058810 A1 Feb. 26, 2026

(30) Foreign Application Priority Data
Aug. 8, 2022 (EP) .................................... 22020380

(51) Int. Cl.
*H04L 9/30* (2006.01)
*H04L 9/08* (2006.01)
*H04L 9/40* (2022.01)

(52) U.S. Cl.
CPC .......... *H04L 9/3073* (2013.01); *H04L 9/0863* (2013.01); *H04L 63/06* (2013.01); *H04L 63/065* (2013.01); *H04L 63/104* (2013.01)

(58) Field of Classification Search
CPC ..... H04L 9/3073; H04L 9/0863; H04L 63/06; H04L 63/065; H04L 63/104
See application file for complete search history.

(56) References Cited

U.S. PATENT DOCUMENTS 7,685,073 B2 * 3/2010 Baker ................ G06Q 20/0855 713/168
2010/0095118 A1 * 4/2010 Meka ................. G06F 21/6227 713/168

(Continued)

OTHER PUBLICATIONS

PCT Search Report and Written Opinion dated Oct. 12, 2023 for related PCT Patent Application No. PCT/CZ2023/050045, 11 pages.

(Continued)

*Primary Examiner* — Cheng-Feng Huang
(74) *Attorney, Agent, or Firm* — Hovey Williams LLP; Paul J. Walker

(57) ABSTRACT

Data encryption system in multi-user environment and end-to-end data encryption comprising system server (1), user device (2), user-system network (3), system application (10) configured for creating, storing, searching, managing the access to data. System application (10) comprises client application (11), server application (12) and agent application (13). Data of the system comprises documents (19) and encryption and decryption keys. Keys are accessible to user (16) and agent application (13) only. Each document (19) is stored on system server (1) encrypted with document key (20). System application (10) defines a position (17), which is unit of company (15) and basic unit of system application (10), on whose behalf all actions with documents (19) are performed. User (16) is assignable to position (17), access of user (16) to document (19) is provided via assigned position (17) only. Each position (17) has unique pair of asymmetric position keys (21) generated by agent application.

13 Claims, 20 Drawing Sheets

(56) References Cited

U.S. PATENT DOCUMENTS

| | | | | |
|---|---|---|---|---|
| 2021/0034773 | A1* | 2/2021 | Rajput | H04L 9/0825 |
| 2021/0407668 | A1* | 12/2021 | Fish | H04L 63/101 |
| 2022/0086000 | A1* | 3/2022 | Munro | H04L 9/0822 |

OTHER PUBLICATIONS

Saxena Urvashi Rahul et al: "Role based access control using identity and broadcast based encryption for securing cloud data", Journal of Computer Virology and Hacking Techniques, Springer Paris, Paris, vol. 18, No. 3, Sep. 18, 2021 (Sep. 18, 2021), pp. 171-182, XP037921391, DOI: 10.1007/S11416-021-00402-1 Abstract, Sections 3 and 4.

* cited by examiner

DATA ENCRYPTION SYSTEM AND METHOD

RELATED APPLICATIONS

This application is the National Stage of International Patent Application No. PCT/CZ2023/050045, filed Jul. 28, 2023, which is hereby incorporated herein by reference in its entirety, and which claims priority to European Patent Application No. 22020380.6, filed Aug. 8, 2022, which is also incorporated herein by reference in its entirety.

TECHNICAL FIELD

The invention relates to a data encryption system in a multi-user environment for data access control and end-to-end data encryption. The invention also relates to computer-implemented data encryption method in the data encryption system.

PRIOR ART

Today's data security risks require additional efforts from service providers to meet customer needs in the field of safety storing and transmitting the data to be inaccessible for the third person. Various prior art documents disclose following features of this technical field: a system and a method of end-to-end encryption of company's data in a multi-user environment, which is a multi-user client-server cloud-based application hosted by the system server; end-to-end data encryption in the system. The system provides revocation of rights for the user, search through the data set and preview of the data. Data encryption involves the generation of an asymmetric user key pair, with the private key encrypted with a key derived from the user's password for his account. The system provides the use of company keys as well as and encrypted data keys.

US2015113279 (A1) discloses a computer implemented method, server computer and computer program for securely storing a data file via a computer communication network and open cloud services. The method includes: providing a user's computer with code for providing a unique user name; asking the user for a password; generating an asymmetric key pair having one public key and one private key; encrypting the private key via a hash of the password; generating a file-specific symmetric key specific for the data file; encrypting the data file via the file-specific symmetric key; encrypting the file-specific symmetric key via the public key; where the code is executed by a web browser on the computer; storing the encrypted file-specific symmetric key as a header part of the encrypted data file, and interacting with the file exchange interface of a cloud service which receives the encrypted data file, and storing the encrypted data file and header part.

US2016335451 (A1) discloses systems, apparatuses, and methods for providing data security for data that is stored in a cloud-level platform. In one embodiment, each session is associated with specific session "keys" for use in encrypting and decrypting data. The session specific keys are generated by a client application and the client public key of a public/private key pair is provided to the cloud platform as part of a user authentication process. If the user is authenticated correctly, then the platform creates its own set of keys and sends the server public key of a public/private key pair to the client. When the client requests a data record or document, the platform can determine if the user is authorized to have access to the entire data record or document or only to certain fields or portions of the record or document. Based on that determination, the platform may selectively encrypt certain fields or portions of the record or document with the client public key.

US2019065773 (A1) discloses systems and methods for securing objects in a computing environment. Objects are encrypted using keys that are also encrypted after encrypting the objects. In order to access the objects, a master key that is unknown to the service storing the objects and/or managing the keys is used to decrypt the keys so that the objects can be decrypted with the decrypted key. Thus, a key is needed to access the key needed to access the object. The master key is typically maintained separately from all of the encrypted objects and corresponding encrypted keys.

US2015186657 (A1) discloses the storage system in which data is encrypted for a user according to a key hierarchy, where relationship among the keys is mapped to relationships among access policies. The system includes (i) a non-stateful encryption server that can simply receive encryption keys or parameters for calculating encryption keys externally, (ii) a key management system separates from the cloud storage service, (iii) a file storage system that stores objects in encrypted format on the storage server and controls access of each user to the objects by managing access to the decryption keys. In the file storage system, when required by access policies, objects may be encrypted by an encryption server using content encryption keys (CEKs). The content encryption keys may be generated based on a key hierarchy, and are accessible to the encryption server. The content encryption keys may be generated outside of the encryption server.

CN110912682 (A) discloses a data processing method, a device and a system. The method comprises the following steps: generating a public key and a corresponding private key based on a password input by a user side; sending the public key to an edge server. The edge server uses the public key to encrypt the stored data information and uploads an encryption result obtained through encryption to a cloud server. Receiving an encryption result downloaded from the cloud server, and decrypting the encryption result by adopting the private key to obtain data information. According to the method and the device, the technical problem that a user difficultly checks the data from the second equipment through a webpage or an application program due to the fact that the second equipment cannot decrypt the data is solved.

WO0074299 (A1) discloses the encrypting electronic information such as a document so that only users with permission may access the document in decrypted form. The process of encrypting the information includes selecting a set of policies as to who may access the information and under what conditions. A remote server stores a unique identifier for the information and associates an encryption/decryption key pair and access policies with the information. Software components residing on the author's computer retrieve the encryption key from the remote server, encrypt the information, and store the encrypted information at a location chosen by the author. A user wishing to access the information acquires the encrypted information electronically. Software components residing on the viewing user's computer retrieve the associated decryption key and policies, decrypt the information to the extent authorized by the policies, and immediately delete the decryption key from the viewing user's computer upon decrypting the information and rendering the clear text to the viewing user's computer screen. The software components are also capable of prohibiting functional operations by the viewing user's computer while the clear text is being viewed.

DE102019101195 (A1) discloses a method of securely transferring a file (F) between a first computer device intended for secure file transfer and a second computer device not intended for secure file transfer via a cloud platform using symmetric encryption of the file to be transferred with a symmetric file key, and asymmetric encryption of a randomly generated file key with a public key asymmetric key pair consisting of a public key and a private key.

US2017017802 (A1) discloses a method of storing and protecting user data in a service provider's cloud, including: storing a value that has been generated by encrypting an account's secret key with the user's secret key, a value other than the account's public key and the associated secret key of the account, the account's secret key and the account's public key, which uniquely form a key pair, are linked to the authorised user's account; save the file that was generated by encrypting the data associated with the authorised user with the data key; save the encrypted account data key, with the encrypted account data key generated by encrypting the data key with the public key of the account; create an invitation link that provides access to the file, this invitation link includes a one-time password; as well as providing access to data associated with an authorised user after obtaining a user-specific secret or one-time password by the following orderly operations performed on a computing machine having a hardware element: (i) decrypting the value to obtain the account key secret, then (ii) decrypting, using the account key thus obtained, the encrypted account data key to obtain the data key, then (iii) decrypting the file using the data key obtained in this way.

US2013246790 (A1) discloses a storage method, system and apparatus. The method comprises: encrypting data with a storage key to obtain encrypted data; encrypting the storage key with two different encryption methods to generate a personal key and a data key, respectively, wherein the personal key can be decrypted with a key from the user who owns the data to obtain the storage key, and the data key can be decrypted with the unencrypted data to obtain the storage key; saving the encrypted data, personal key and data key in a server. The technical scheme of the present invention can prevent saving duplicate files while ensuring that the unencrypted data cannot be accessed by any other users and storage service providers.

U.S. Pat. No. 9,529,733 (B1) discloses computer-implemented method for securely accessing encrypted data stores including receiving, from a data storage service, a request to permit authenticated access to an encrypted data store administered by the data storage service, the request including a cryptographic element associated with the encrypted data store that has been encrypted using a public key associated with the authentication device, decrypting the cryptographic element associated with the encrypted data store using a private key associated with the authentication device, encrypting the cryptographic element associated with the encrypted data store using a public key associated with a cryptographic client, and transmitting the encrypted cryptographic element to the cryptographic client to enable the cryptographic client to perform cryptographic operations on the encrypted data store.

CN103248479 (A) discloses a cloud storage safety system, a data protection method and a data sharing method. The cloud storage safety system comprises a third party, a client and a cloud storage system, wherein the third party is used for issuing a digital certificate for a user and managing the digital certificate; the client encrypts data to be stored with a data key, acquires a public key and a private key corresponding to the digital certificate, encrypts the data key with the public key, decrypts the data key with the private key, acquires and stores the digital certificate, stores the private key corresponding to the digital certificate, and transmits the encrypted data to be stored and the data key to the cloud storage system; and the cloud storage system is used for controlling user access and storing the data of the client. The safety system and the methods effectively avoid safety threats possibly existing in the cloud storage system and meet the safety requirement of the user on the cloud storage service.

US2010095118 (A1) discloses Cryptographic Key Management System facilitating secure access of data portions to corresponding groups of users. In an embodiment, corresponding group key (asymmetric key pair) is provided for each group, with the private key being stored in a secure format requiring the user credentials for decryption. In addition, a data key required to decrypt a data portion of interest is encrypted using the group public key. Thus, when a user attempts to access a data portion, the user credentials are used to decrypt the group private key, which is then used to decrypt the data key. The data key is then used to decrypt the data portion of interest.

US2017244556 (A1) discloses scalable method and system for secure sharing of encrypted information in a cloud system, the encrypted information being encrypted only once, and each user joining and accessing a shared folder by individual encrypted key material transferred.

DISCLOSURE OF INVENTION

The object of the invention is to eliminate the above-mentioned disadvantages, which are:

Encrypting data with user keys requires a lot of computational work when providing an access to a large number of data to a user in an enterprise environment. It is critical at assigning a new user to the position or granting access to a large number of documents in other cases.

All encryption and decryption actions are performed on the user device, which imposes restrictions on the amount of computational work that can be done. The preview generation and fulltext indexing processes on encrypted data is resource intensive so it's better to perform it on the server and not the user device.

It is impossible to perform data processing (providing access, indexing and preparing data for data preview on a schedule or on demand) at a time when users are not connected to the system.

Difficulty in granting access to several users to the same data in the case of appointing, acting or referent to the position. In an enterprise environment, several users may have the same data access while acting for one position.

Other objects of the invention are:

The data of the company must be stored encrypted.

The system server must have access to the documents of the company only in encrypted form.

Only company users should have access to decryption keys for company documents.

It is necessary to be able to index the documents for full-text search.

It is necessary to be able to grant and revoke users' permissions, including on a schedule.

It is necessary to be able to generate a preview of a file.

The said object is achieved using a data encryption system in a multi-user environment for data access control and end-to-end data encryption comprising: a system server configured for storing and processing the data; an user device configured for providing the functions of the data encryption system to the user; user-system network for communication and transmission of the data between the system server and the user device; a system application configured for creating, storing, transferring, reading, changing and searching the data, and for managing the access to the data; the system application comprises: a client application, physically located and running on the user device; a server application, physically located and running on the system server and communicating with the client application; the data of the data encryption system comprises the documents and encryption and decryption keys; the system application is configured to define and to set: a company, which is an account in the system application, within which the documents are stored and exchanged; an user, which is an individual using the functionality of the system application, having an user account in the data encryption system; the encryption and decryption keys are accessible to the user only and are provided for encryption and decryption the documents and the keys themselves: the client application is configured to generate a symmetric document key for encryption of the document, the client application is configured to generate user keys for encryption and decryption of the keys accessible for the specific user, each user has an unique pair of asymmetric user keys, namely user public key and user private key; the encrypted document key, the user public key and the encrypted user private key are stored on the system server, each document is stored on the system server encrypted with the document key and is transmittable to the user devices in encrypted form to be decrypted by document key and made accessible to the user; according to the invention the principle of which is that the system application is configured to define and to set: a position, which is a unit of the company and a basic unit of the system application, on whose behalf all actions with documents are performed; the user is assignable to the position; access of the user to the document is provided via assigned position only; each position has a unique pair of asymmetric position keys, namely position public key and position private key; the document key is stored on the system server encrypted with the position public key and is transmittable to the user in encrypted form; the position public key is stored on the system server; the position private key is stored on the system server encrypted with the user public key and is transmittable to the user in encrypted form, to decrypt the encrypted document key.

The advantages of the data encryption system according to the invention are:

- In a corporate environment, it is important to quickly provide a new user with access to the necessary data to perform his functional duties, including the transfer of previously opened tasks and documents from the previous user on the position, when assigning a user to a position. The need to quickly change access to corporate data is relevant when hiring, transferring from position to position and dismissing;
- The possibility of providing identical access to several users in case of appointment of an acting or referent to the position;
- The operation of preparing the position keys for the user is not resource-intensive, in contrast to the operations of encrypting document or document keys for the user;
- Due to position, there is no limitation concerning large number of documents and users in staff turnover cases.

In a preferred embodiment of the data encryption system, the system application comprises an agent application, located, separately from the client application and from the server application, on the company local server, to which only the company has access and which is connected to the system server via the company-system network, the agent application is in communication with server application, the agent application is configured to generate a pair of asymmetric agent keys, namely agent public key and agent private key for encryption of data; the agent private key is accessible on the company local server only. An advantage of this preferred embodiment is., that resource-intensive operations can be performed on a high-performance Server; and availability for data processing at any time.

In a preferred embodiment of the data encryption system, the agent application is configured to encrypt the each unencrypted document, stored on the system server, with document key and to encrypt the document key with agent public key. An advantage of this preferred embodiment is, that access to the data is granted to the agent application, which allows the agent application to perform further operations with the data.

In a preferred embodiment of the data encryption system, the agent application is configured to decrypt the position private key, encrypted with agent public key and stored on the system server, with the agent private key and to encrypt the decrypted position private key with user public key for the specific position. An advantage of this preferred embodiment is, that distribution of access to the keys of positions is carried out centrally using the agent application; and the preparation of keys itself does not require document encryption operations, and is not resource-intensive.

In a preferred embodiment of the data encryption system, the agent application is configured to decrypt the document key, encrypted with the agent public key and stored on the system server, with the agent private key, to encrypt the decrypted document key with the position public key to provide to the position the access to the document key and to the encrypted document. An advantage of this preferred embodiment is, that it allows granting access to a document to the position on a schedule, from a certain moment or under certain conditions; and the operation is not resource-intensive, because does not require data encryption, but only the keys.

In a preferred embodiment of the data encryption system, the agent application is configured to generate new position key, to encrypt the position private key with user public key and to encrypt all the specific document keys with the position public key. An advantage of this preferred embodiment is, that it allows changing the keys in case of a compromise of the key or in case of dismissal of the user from the company if necessary; and it allows implementing a policy of periodically changing encryption keys.

In a preferred embodiment of the data encryption system, the agent application is configured to generate the document preview and to encrypt the generated document preview with document key. An advantage of this preferred embodiment is, that it allows performing resource-intensive operations on server hardware without dependence on user devices; and the required level of security is provided, because data operations are performed on the company's local server.

In a preferred embodiment of the data encryption system, agent application is configured to index the document for full-text search of the document. An advantage of this preferred embodiment is, that it allows performing resource-intensive operations on server hardware without dependence on user devices; and the required level of security is provided, because data operations are performed on the company's local server.

The said object is also achieved using a computer-implemented data encryption method in the system according to the claim 1, comprising: defining an user; generating user key, by the client application, for each user, as a pair of asymmetric user keys, namely user public key and user private key, encrypting the user private key, storing the user public key and the encrypted user private key by the server application on the system server; creating a new document, by the client application; generating the document key, by the client application, as a symmetric document key, for the created document, encrypting the document with document key, encrypting the document key storing the encrypted document and the encrypted document key by the server application on the system server; accessing the content of the document to the user, through transmitting the encrypted document and the encrypted document key by the server application from the system server to the client application, transmitting the decryption key to the user for decrypting the encrypted document key in the client application, decrypting the document with the decrypted document key; according to the invention the principle of which is that before the step of creating a new document, there are the steps of defining a position, assigning user to position, generating the position key, for each position, as a pair of asymmetric position keys, namely position public key and position private key, encrypting the position private key, and storing the position public key and the encrypted position private key by the server application on the system server; in the step of encrypting the document key, the document key is encrypted with position public key, for the position which has access to the document, in the step of transmitting the decryption key to the user, the transmitted decryption key is the position private key encrypted with the user public key, to be decrypted with user private key by the client application and to provide the user the access to the position private key accessible to the position assigned to the user.

The advantages of the computer-implemented data encryption method according to the invention are:

- In a corporate environment, it is important to quickly provide a new user with access to the necessary data to perform his functional duties, including the transfer of previously opened tasks and documents from the previous user on the position, when assigning a user to a position. The need to quickly change access to corporate data is relevant when hiring, transferring from position to position, and dismissal;
- The possibility of providing identical access to several users in case of appointment of an acting or referent to the position;
- The operation of preparing the position keys for the user is not resource-intensive, in contrast to the operations of encrypting document or document keys for the user.
- Due to position, there is no limitation concerning large number of documents and users in staff turnover cases.

In a preferred embodiment of the data encryption system, in the step encrypting the position private key, the position private key is encrypted with the user public key, for the user assigned to the position. An advantage of this preferred embodiment is, that the operation is not resource intensive; and it allows granting access to the user immediately to a large number of documents available to the position.

In a preferred embodiment of the data encryption system, the position key is generated by the agent application; before the step of generating the position key, there are the steps of generating the agent key, by the agent application located on the company local server separately from the client application and from the server application, as a pair of asymmetric agent keys, namely agent public key and agent private key, and storing the agent private key on the company local server and storing the agent public key on the system server; in the step encrypting the position private key, the position private key is encrypted with the agent public key, by the agent application; before the step of transmitting the encrypted position private key to the user, there are the steps of transmitting the user public key and the position private key encrypted with agent public key to the agent application, decrypting the encrypted position private key with agent private key, by the agent application, encrypting the position private key with user public key, for the user assigned to the position, by the agent application, and storing the position private key encrypted with user public key to the system server. An advantage of this preferred embodiment is, that the agent application has access to the keys of all positions, since it generates them; this allows providing access to position keys centrally at a single point in the agent application; the position key management can be performed according to a schedule or other business case, regardless of the connection status of the users; and the operation is not resource intensive.

In a preferred embodiment of the data encryption system, in the step of encrypting the document key, the document key is encrypted with agent public key (29), by the client application; before the step of transmitting the encrypted document and the encrypted document key, there are the steps of transmitting the position public key and the document key encrypted with agent public key to the agent application, decrypting the encrypted document key with agent private key, by the agent application, encrypting the document key with position public key, by the agent application, and storing the document key encrypted with position public key on the system server. An advantage of this preferred embodiment is, that any document is available for further processing by the agent application; and access to a specific document can be set by the agent application on a scheduled or conditional basis, without the need for users to be online.

In a preferred embodiment of the data encryption system, the agent application provides following steps: receiving the encrypted document and the encrypted document key, decrypting the document key with the agent private key, decrypting the document with the document key, generating the document preview, encrypting the document preview with the document key, storing the encrypted document preview on the system server. An advantage of this preferred embodiment is, that it allows performing resource-intensive operations on server hardware without dependence on user devices; and the required level of security is provided, because data operations are performed on the company's local server.

In a preferred embodiment of the data encryption system, the agent application provides following steps: receiving the encrypted document and the encrypted document key, decrypting the document key with agent private key, decrypting the document with document key, generating the document fulltext index, storing the document fulltext index on the company local server. An advantage of this preferred embodiment is, that it allows performing resource-intensive operations on server hardware without dependence on user devices; and the required level of security is provided, because data operations are performed on the company's local server.

BRIEF DESCRIPTION OF DRAWINGS

The data encryption system and method will be described in more detail with reference to examples of particular embodiments, which are illustrated by way of nonlimiting examples in the accompanying drawings, wherein.

DESCRIPTION OF PREFERRED EMBODIMENTS

The system and method embodiments described below provides end-to-end data encryption in a multi-user environment in such a way that only the sender and recipient users have access to the original data, and the original data remains inaccessible to the servers involved in storing and transmitting data. End-to-end encryption is an additional layer of data security.

Figure 1:
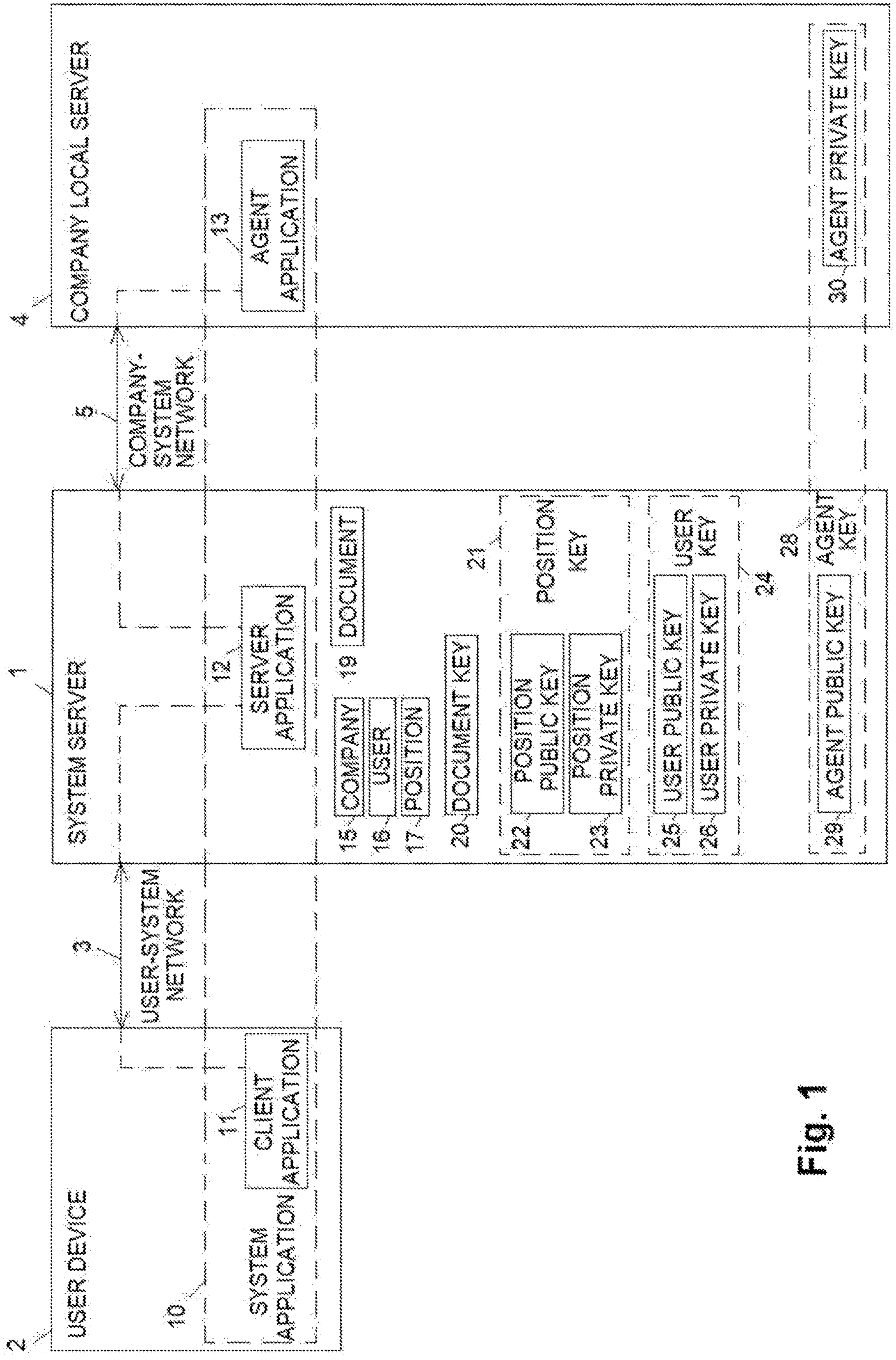
FIG. 1 shows an overview diagram of the data encryption system with system server, user device and company local server.
Figure 2A:
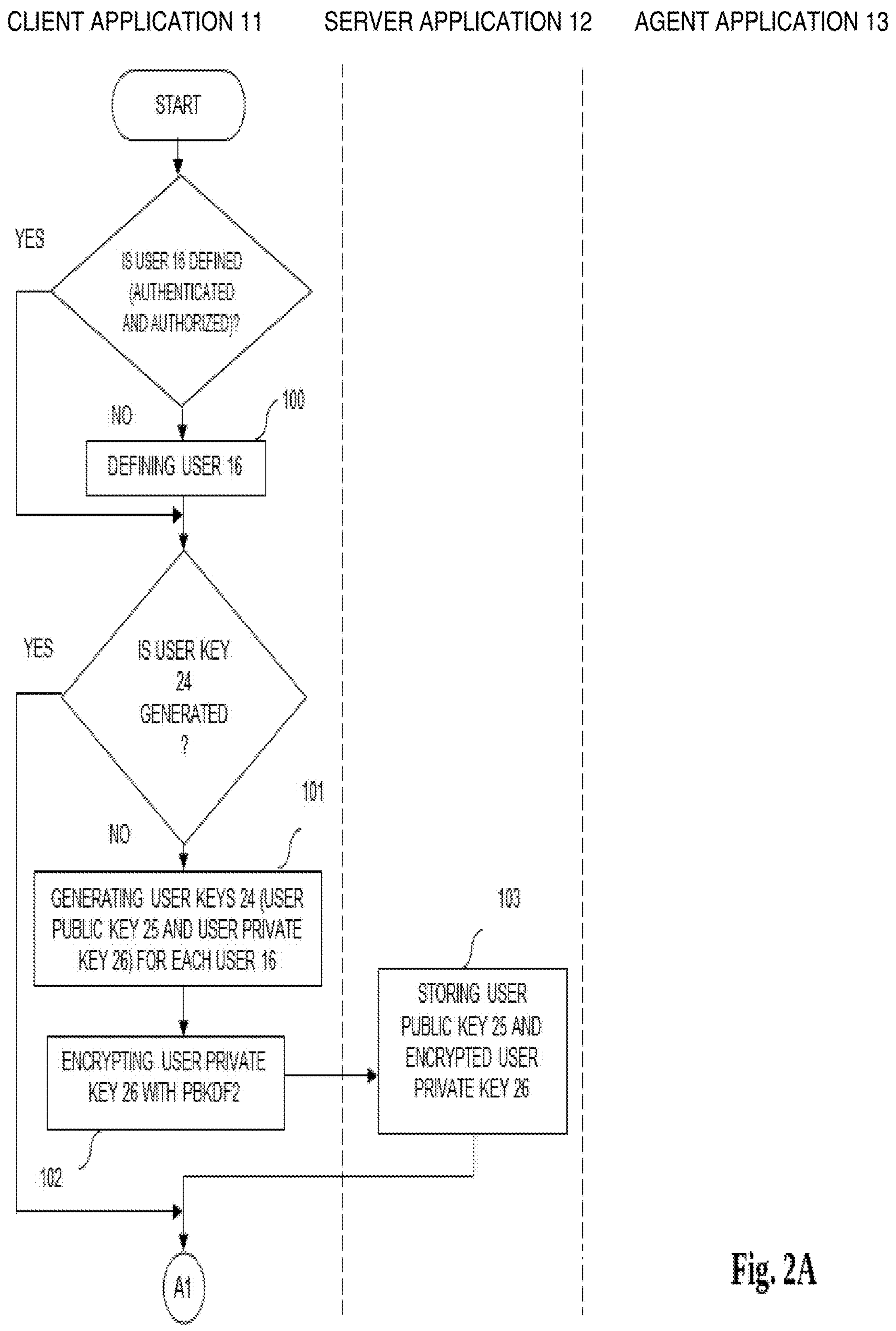
FIGS. 2A-2E show a flowchart of the data encryption method for creating, storing and accessing the documents with using user keys, document keys, position keys.
Figure 2B:
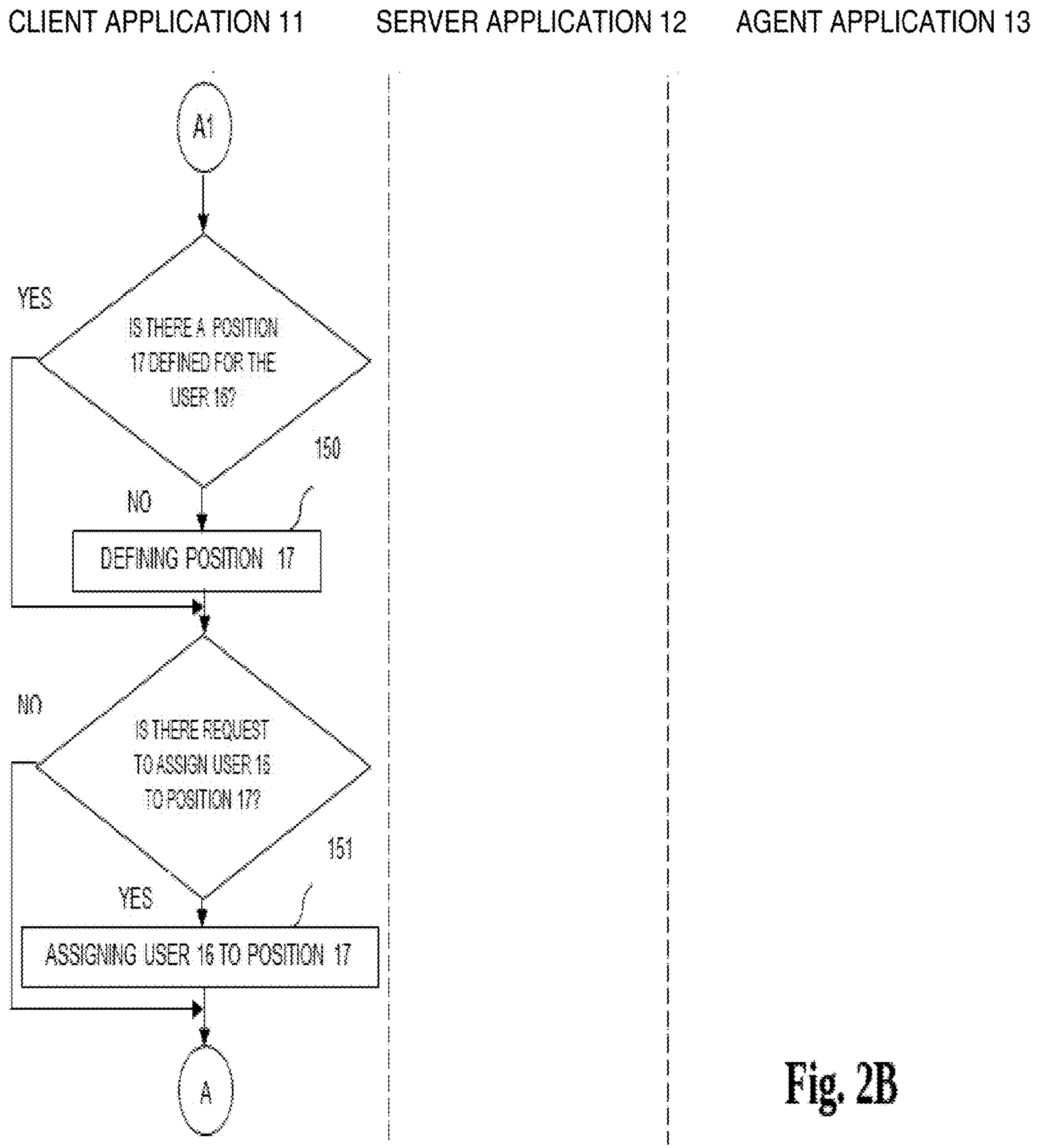
Figure 2C:
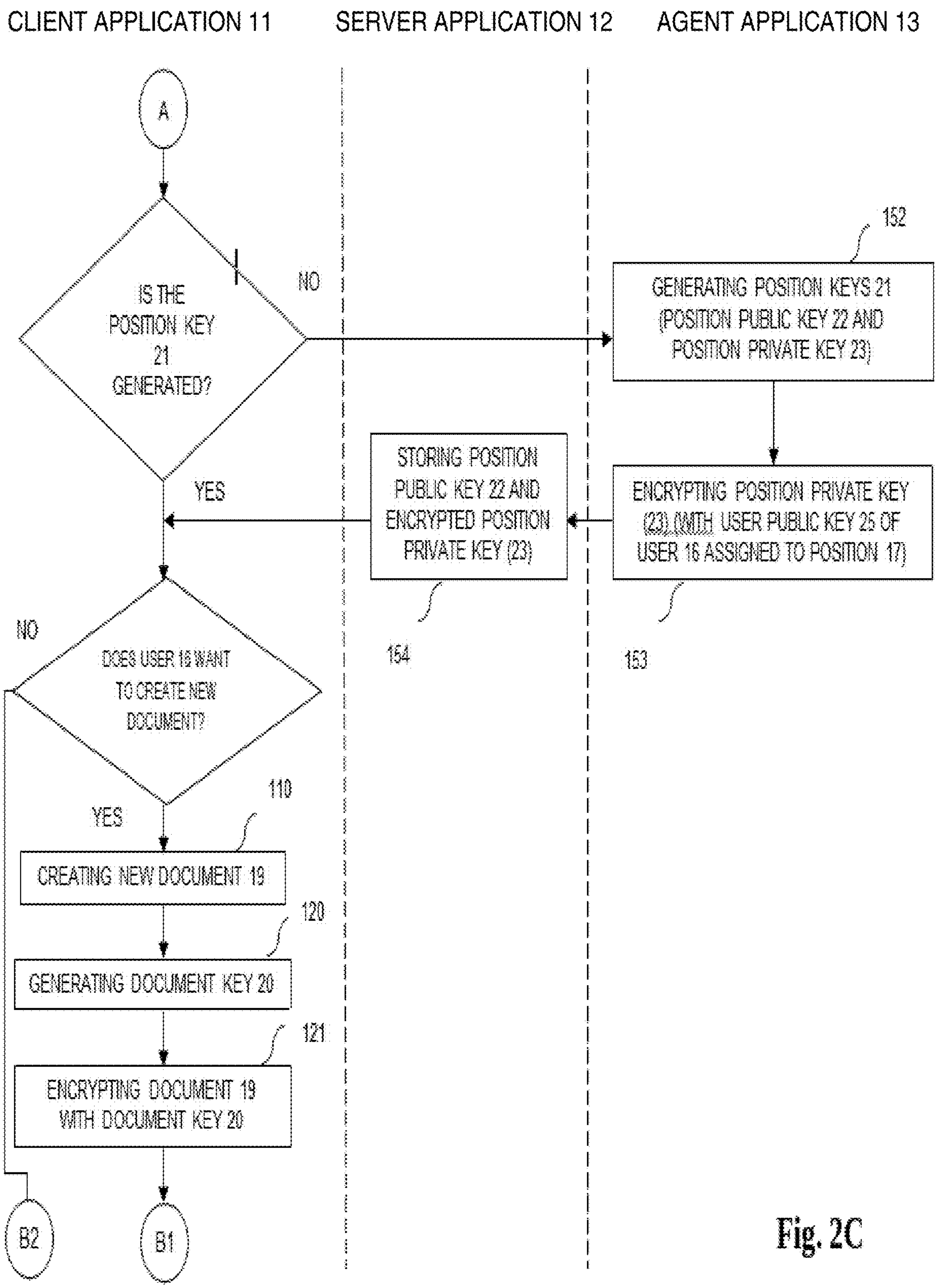
Figure 2D:
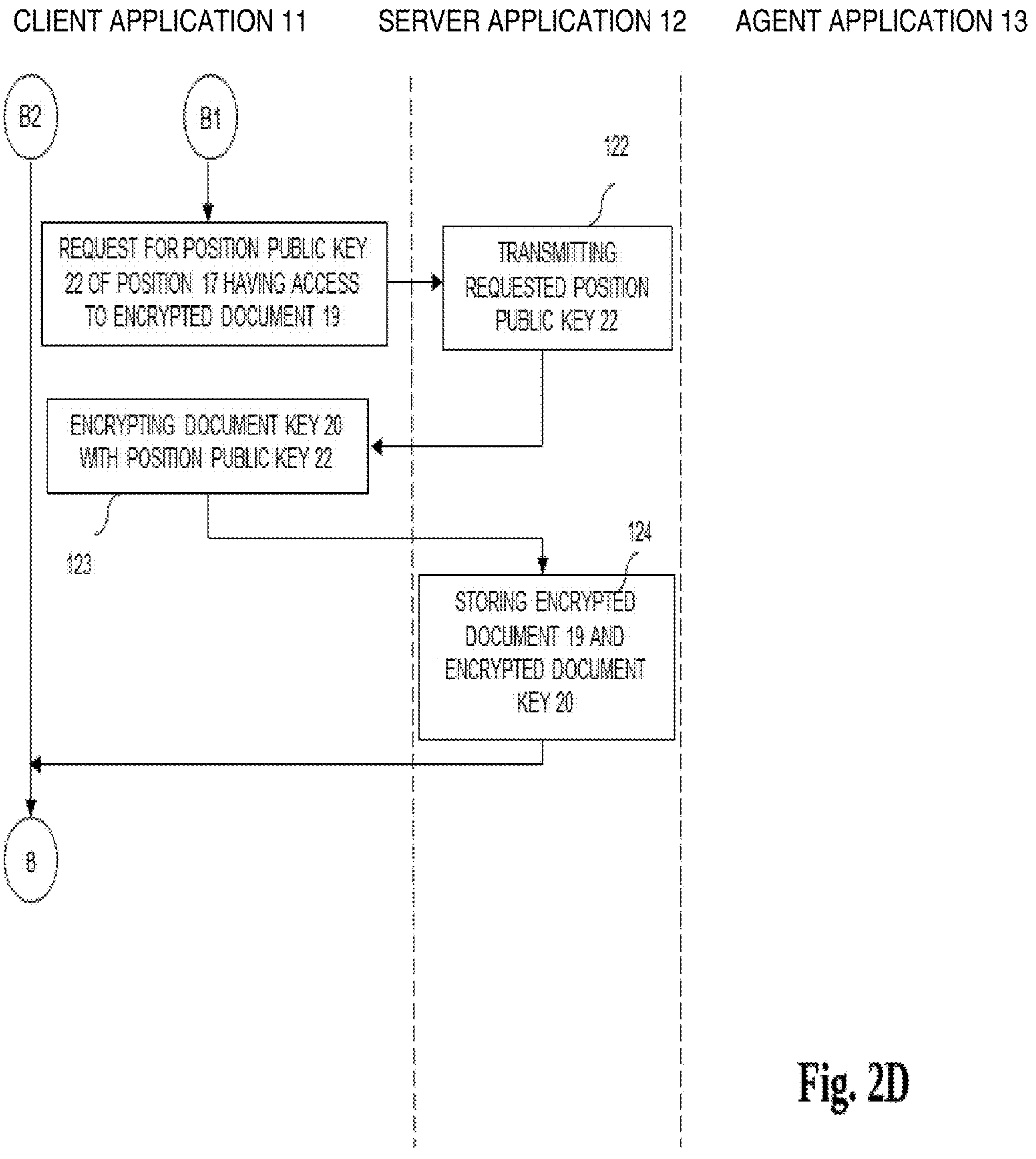
Figure 2E:
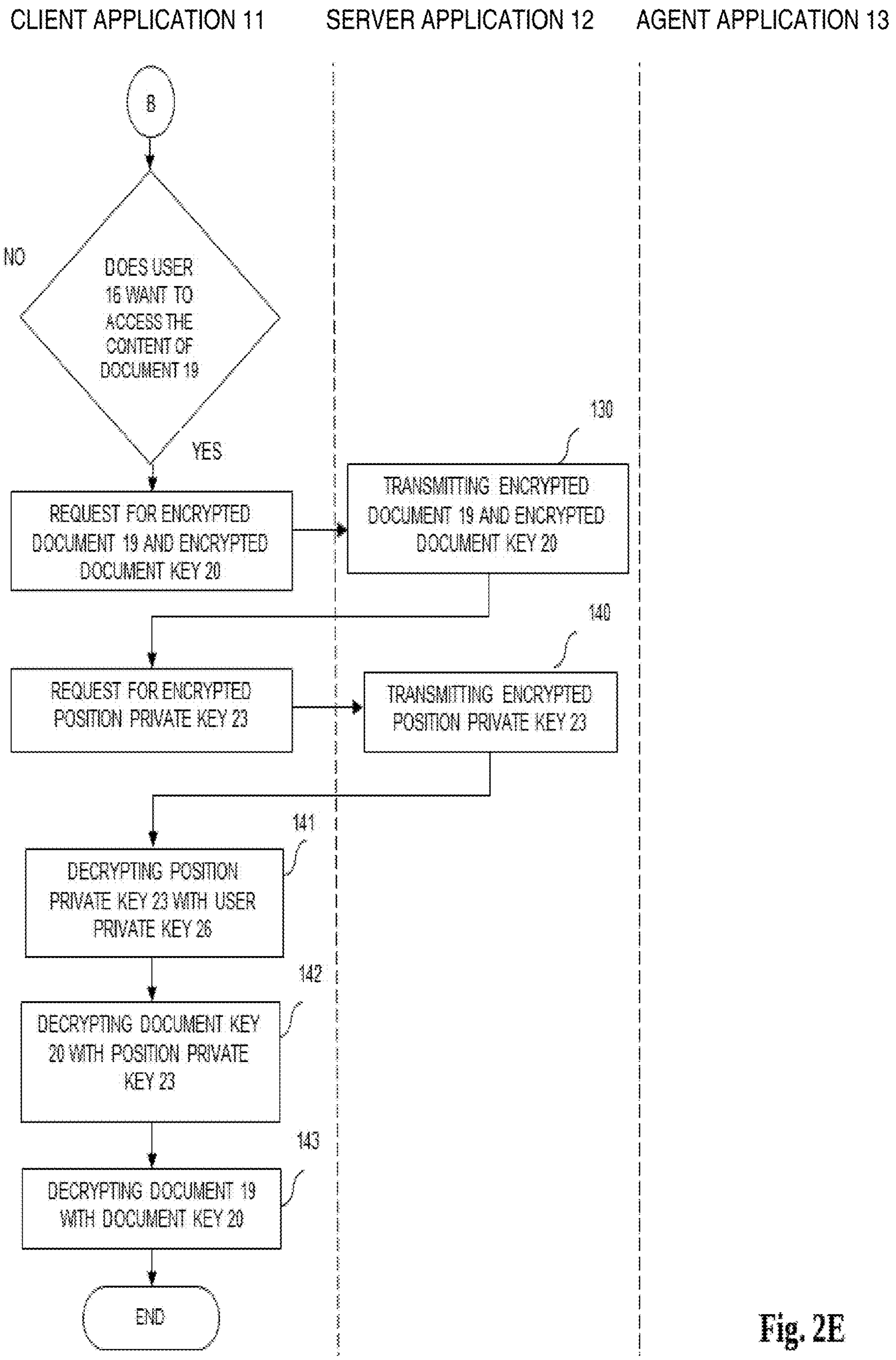
Figure 3A:
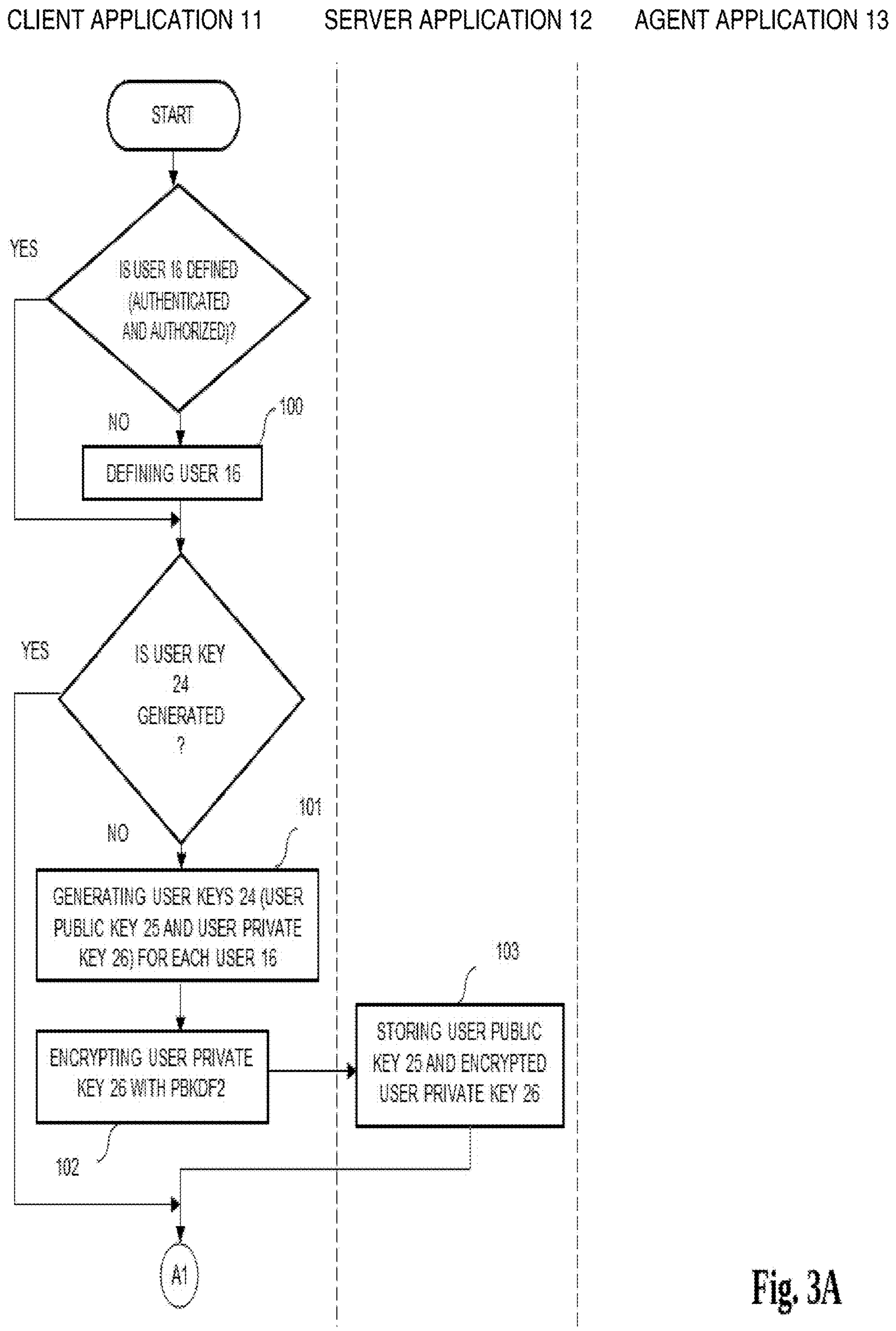
FIGS. 3A-3F show a flowchart of one embodiment of the data encryption method for creating, storing and accessing the documents with using user keys, document keys, position keys and agent keys.
Figure 3B:
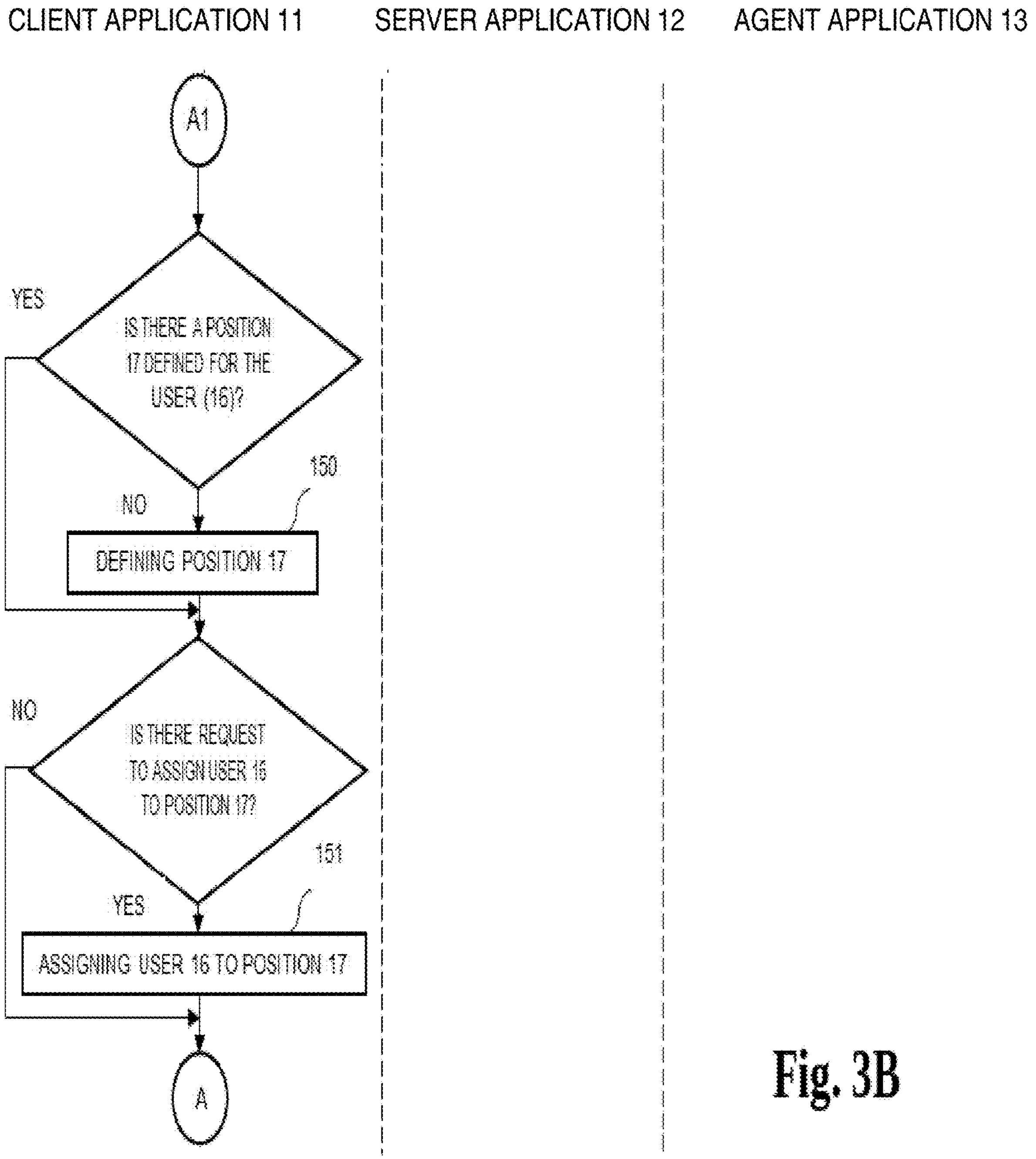
Figure 3C:
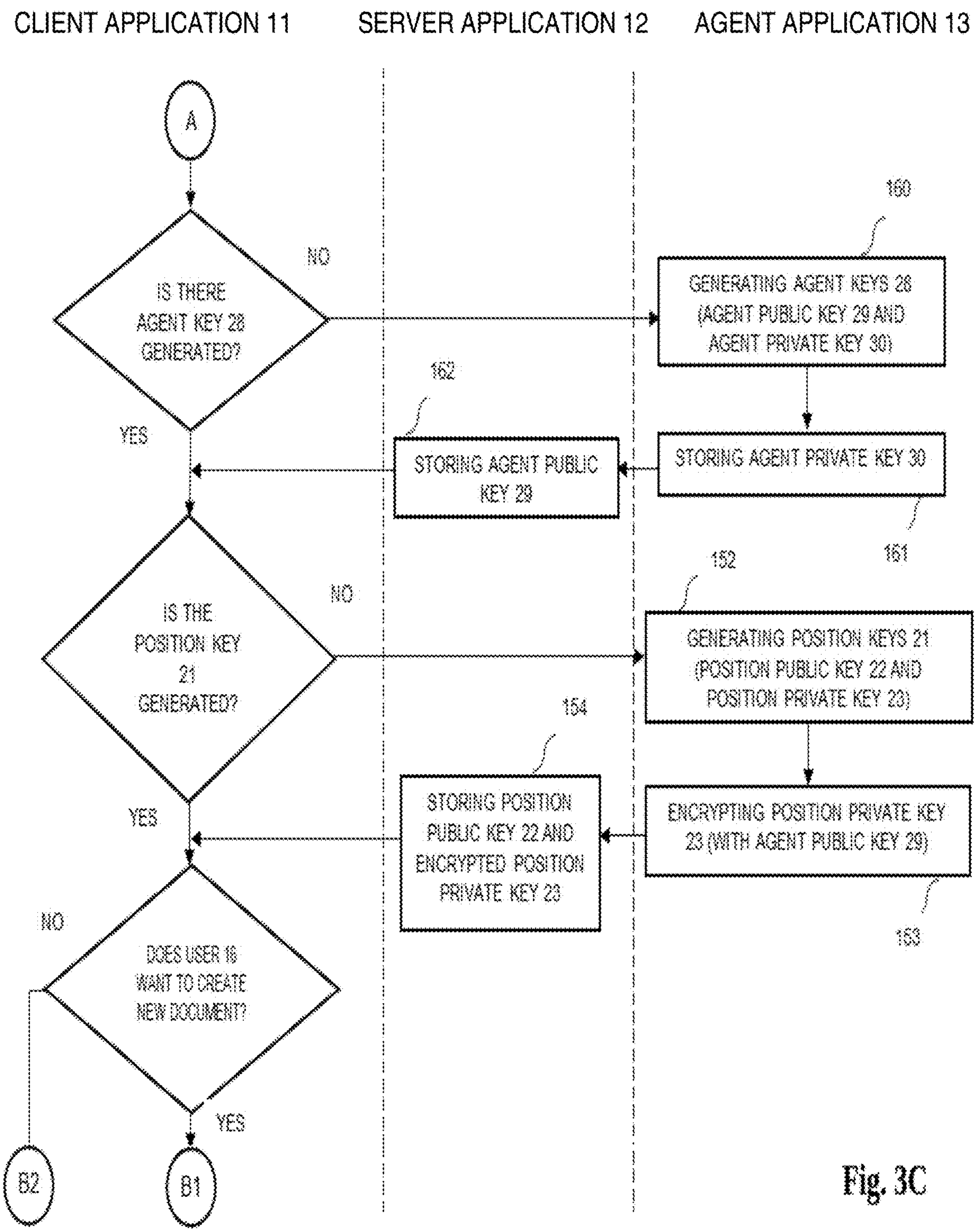
Figure 3D:
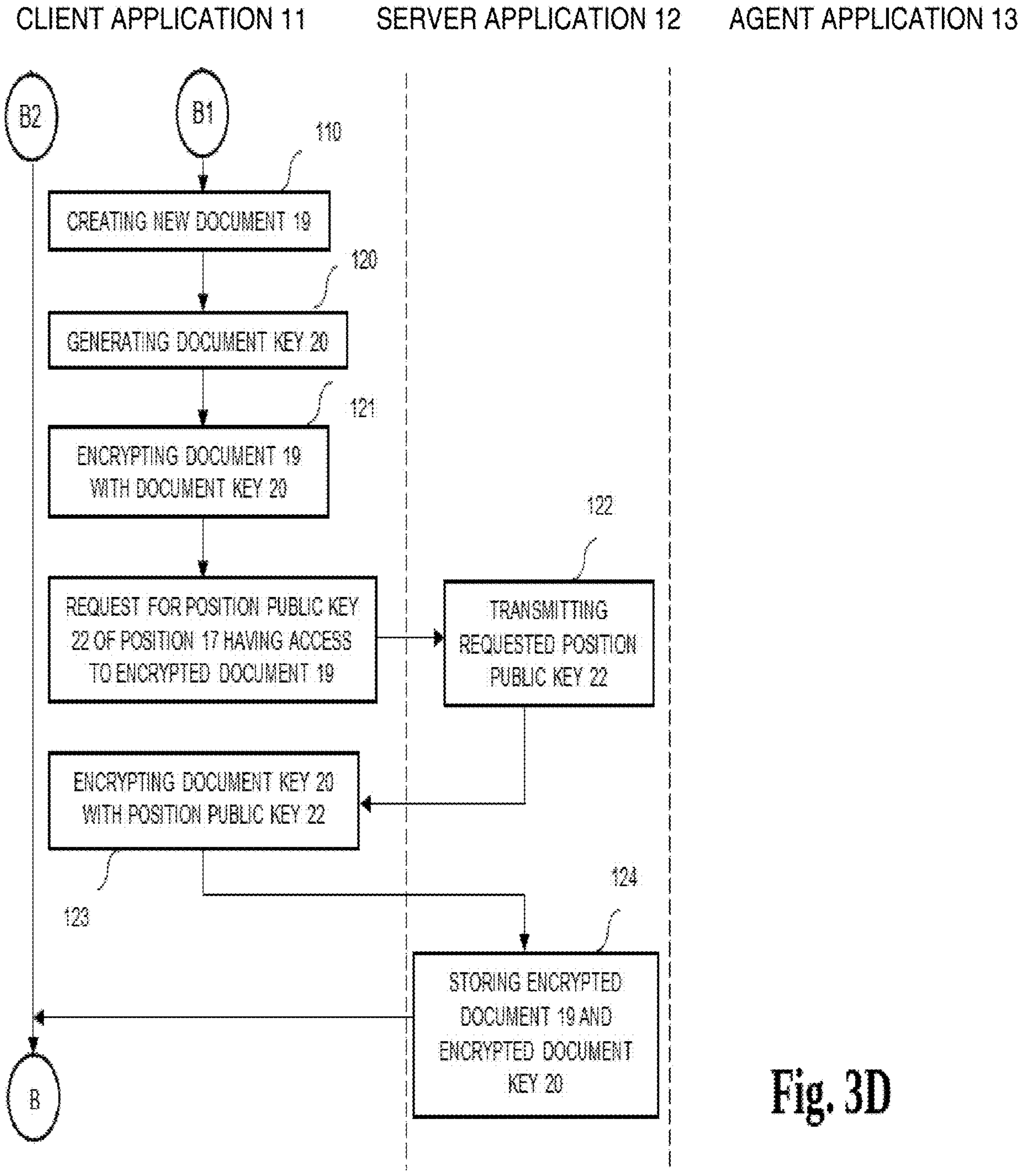
Figure 3E:
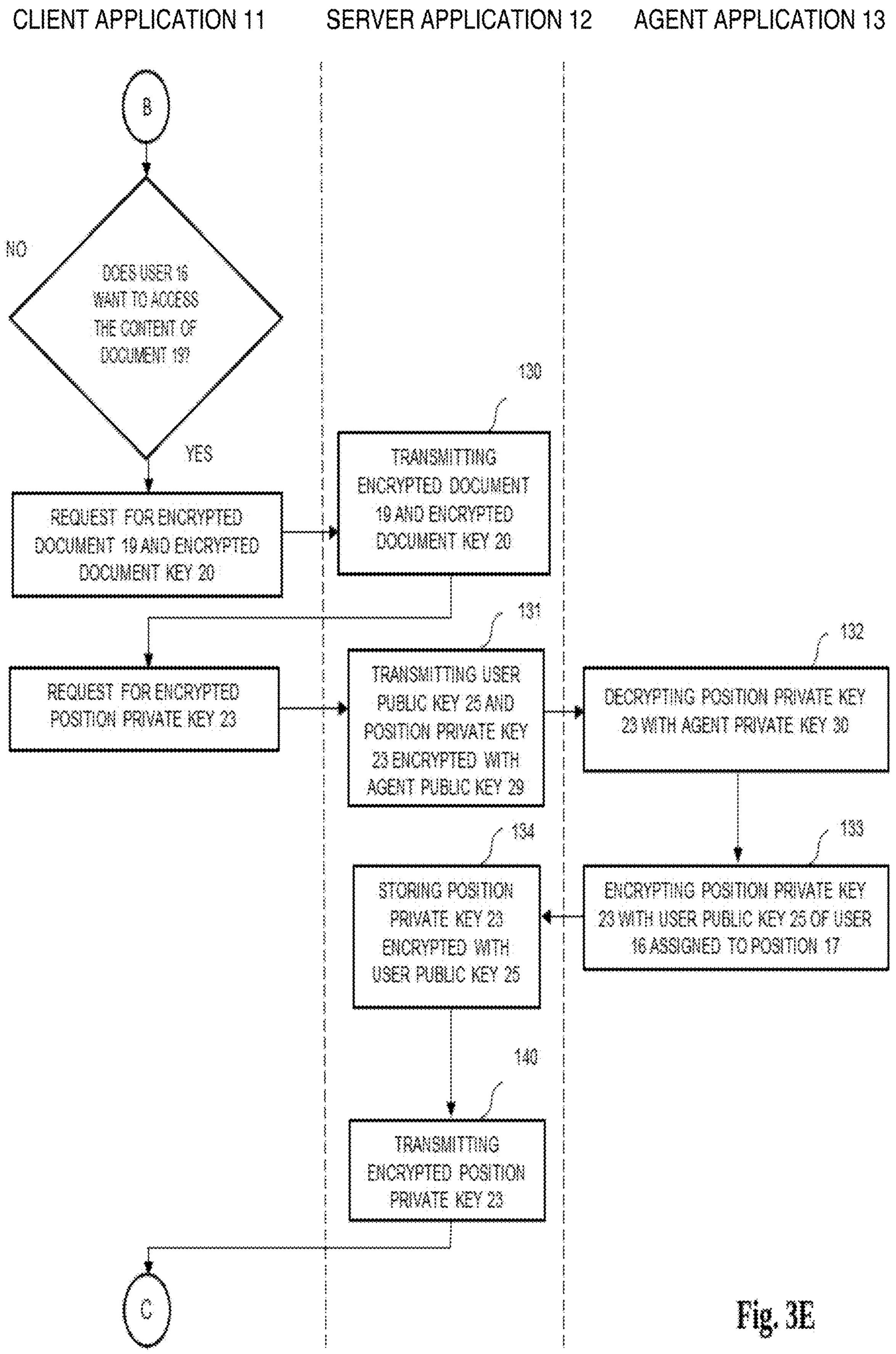
Figure 3F:
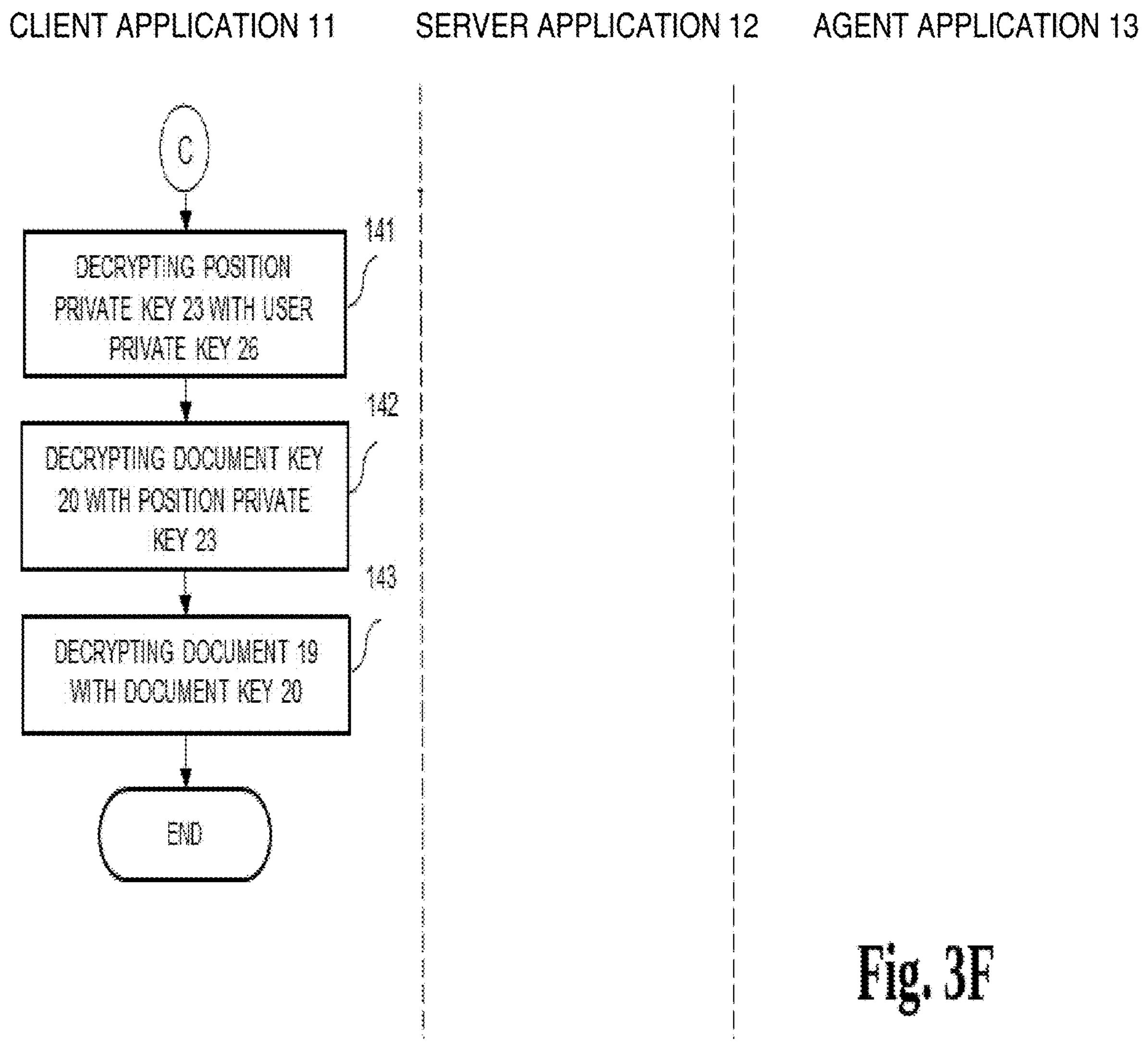
Figure 4A:
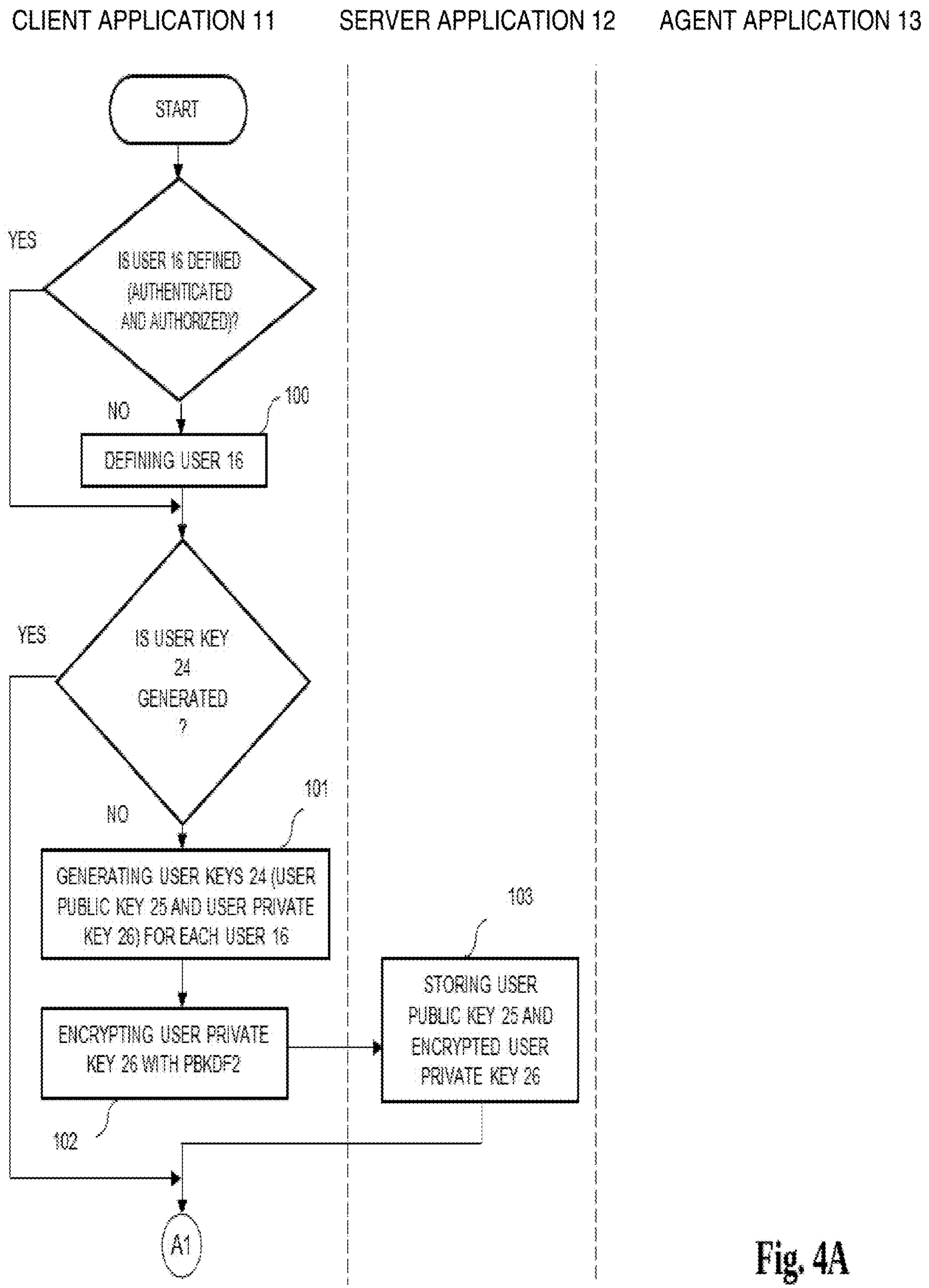
FIGS. 4A-4F show a flowchart of second embodiment of the data encryption method for creating, storing and accessing the documents with using user keys, document keys, position keys and agent keys.
Figure 4B:
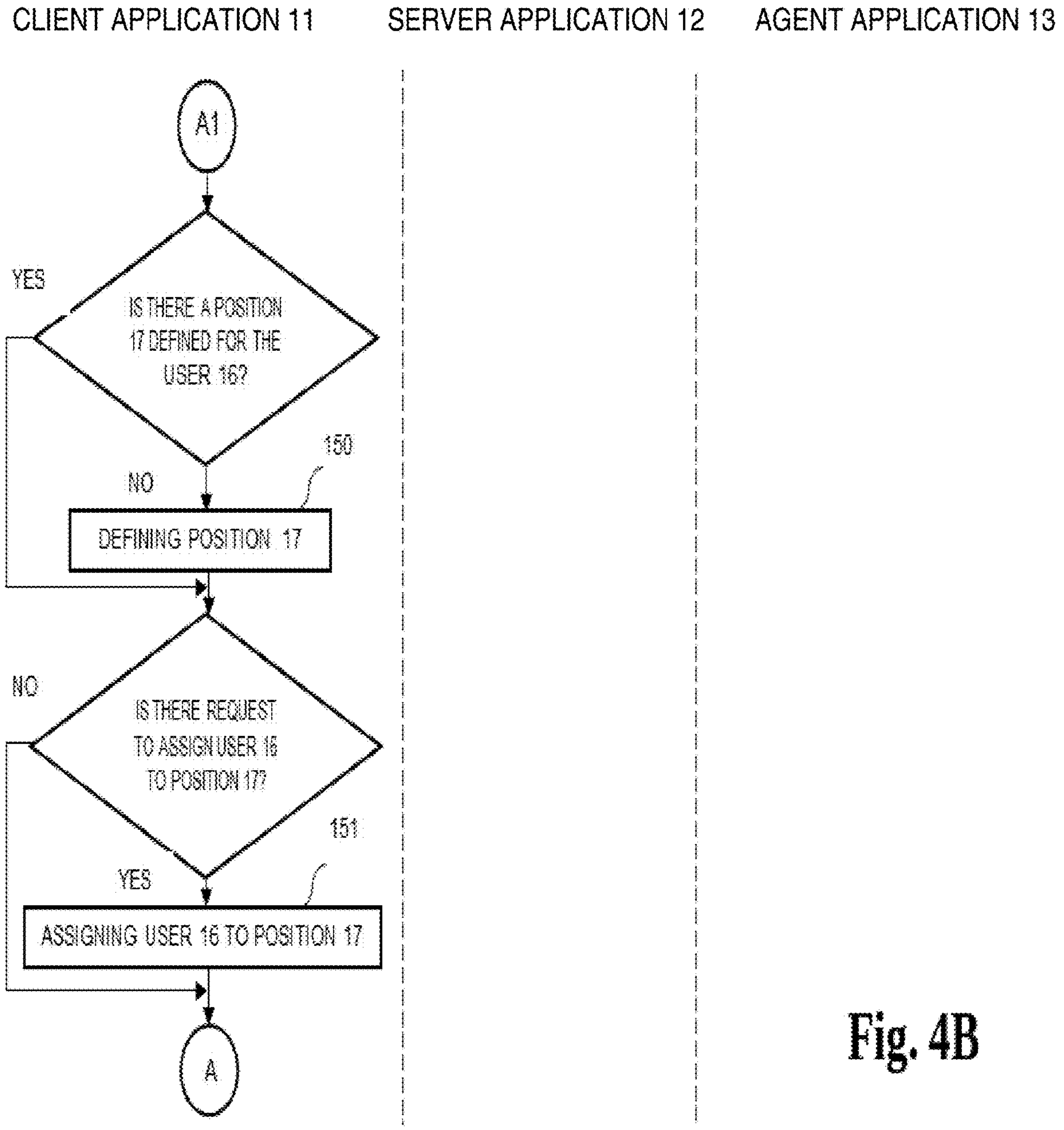
Figure 4C:
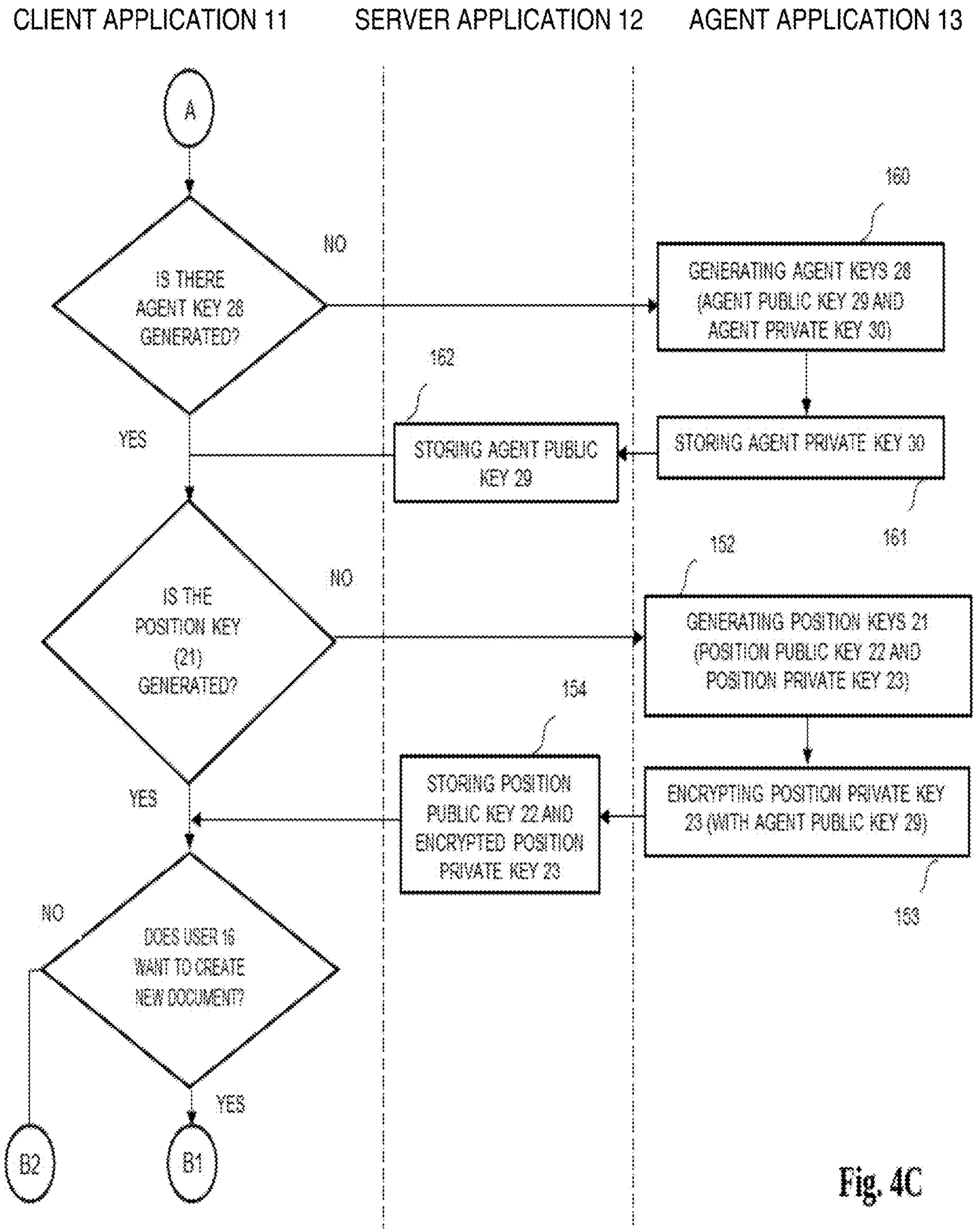
Figure 4D:
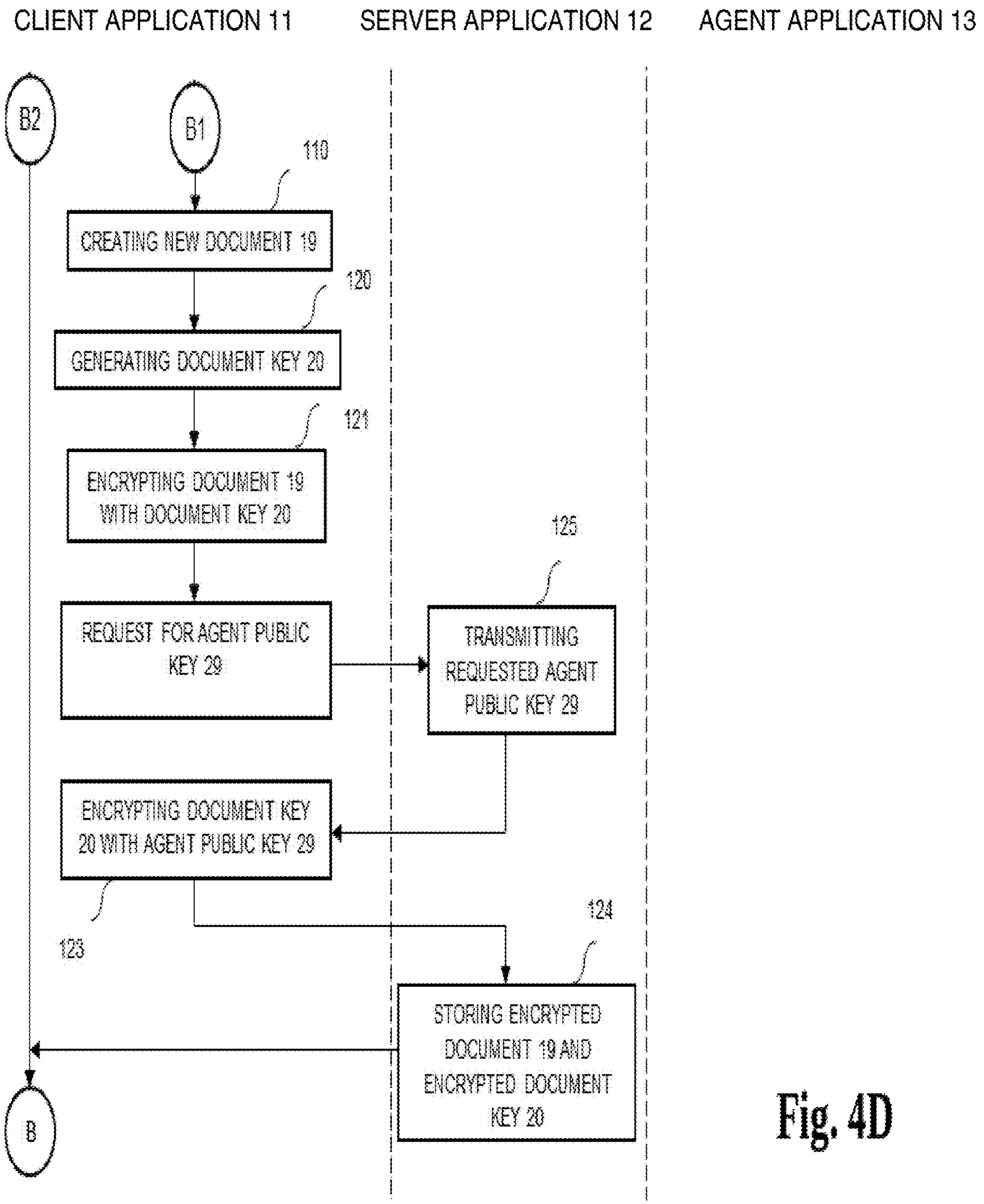
Figure 4E:
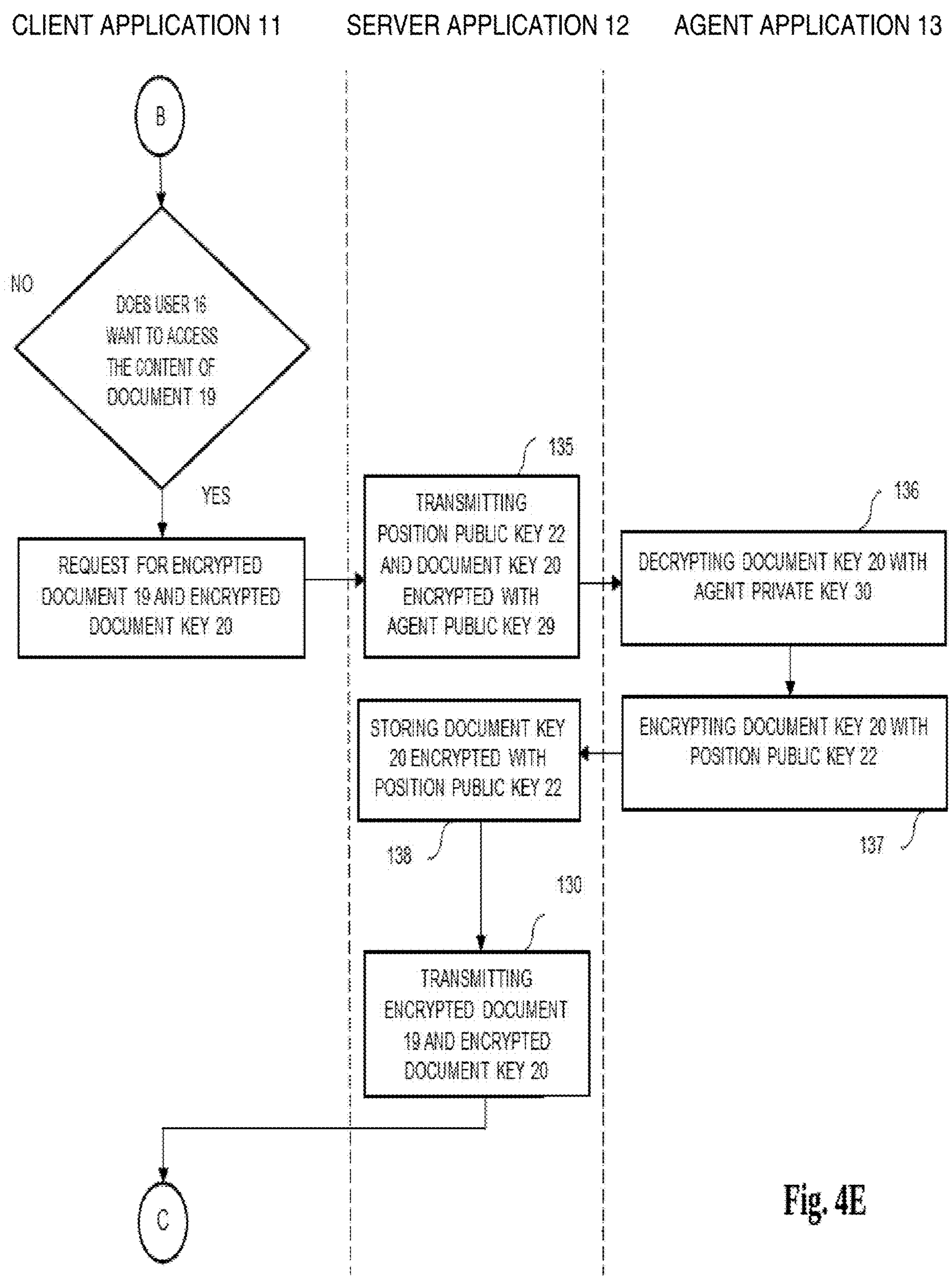
Figure 4F:
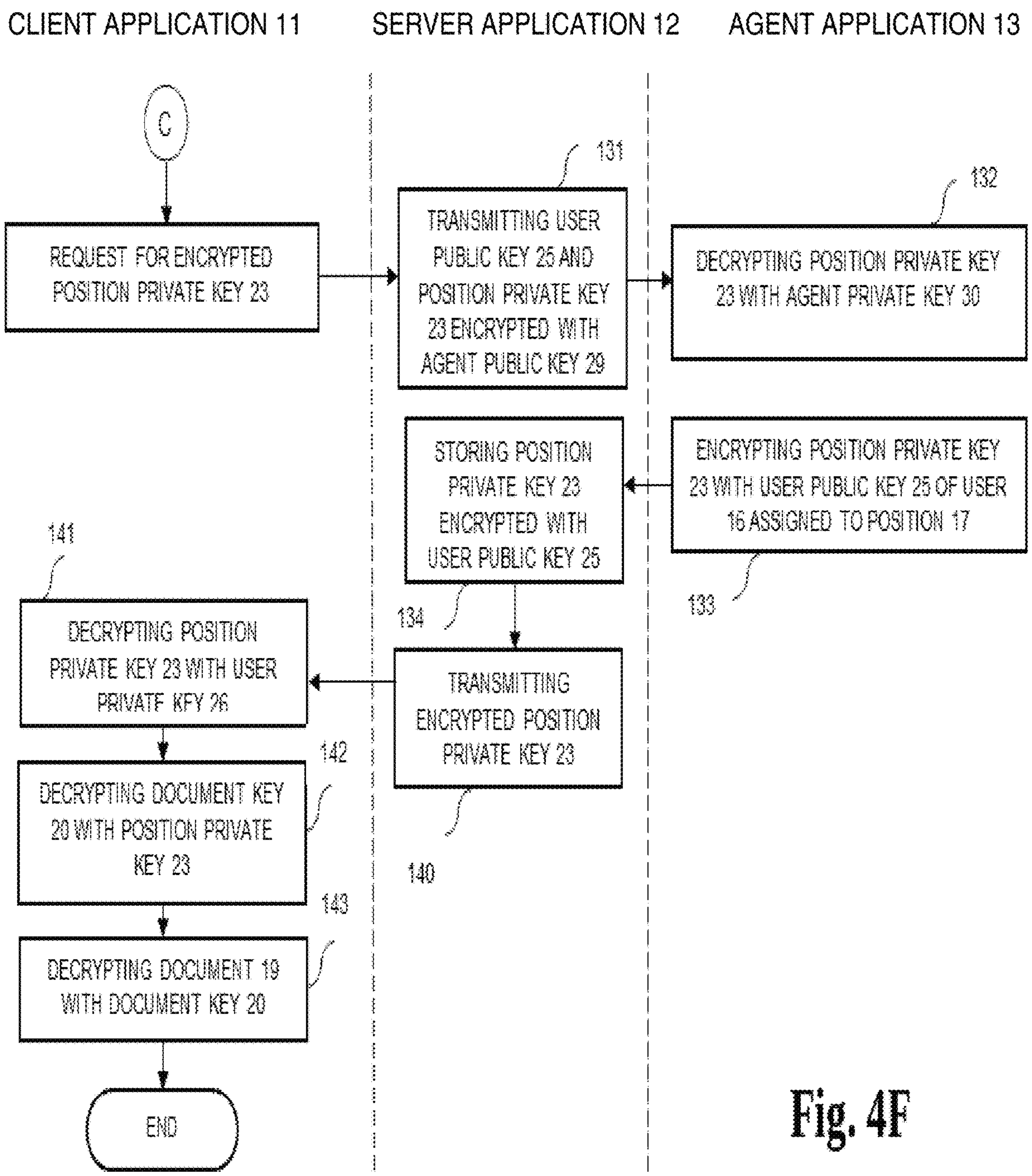

FIG. 1 shows an overview diagram of the data encryption system with system server 1, user device 2 and company local server 4.

System provides the functionality of creating, storing, transferring and accessing the data between users 16 assigned to the company 15.

Company 15 is an account of the system within which the data is stored and exchanged between users 16 assigned to the positions 17 in the company 15, for which a name is specified, and for which the tariff plan and other basic settings of the system are configured. Additionally, the company 15 is understood as a legal entity or an individual that uses the functionality of the system.

User 16 is an individual, with a unique username and password, who uses the functionality of the system. A user 16 may have access to the data in one or more companies 15. User 16 should proceed with the invitation request from a company administrator to confirm the acceptance of the invitation. That opens access of that user 16 to the data of the company 15.

A unit of the company organizational structure is a position 17. Position 17 is the basic unit of the system defining the user's permissions to take action and data access. Any action with stored data is performed on behalf of the position 17. Position 17 is associated with a specific user 16, so access to the user 16 to the document 19 is provided via assigned position 17 only.

Actions in the system are performed with the understanding of what a user did. The user 16 can be assigned to one or more positions 17 at a time. The data of the data encryption system comprises the documents 19 and encryption and decryption keys.

Document 19 is a collection of information, which is a set of data and files. Document 19 means any object type of the system: document, task, chat, folder, value, etc. due to their similarity.

The system comprises a system server 1 configured for storing the data, a user device 2 configured for providing the functions of the data encryption system to the user 16, a company local server 4, to which only the company 15 has access. The system server 1 and the user device 2 are connected via user-system network 3 for communication and transmission of the data between them. The company local server 4 is connected to the system server 1 via the company-system network 5.

Creating, storing, transferring, reading, changing, and searching the data, and managing the access to the data is provided via a system application 10. The system application comprises a client application 11, physically located and running on the user device 2, a server application 12, physically located and running on the system server 1 and communicating with the client application 11, and an agent application 13, located, separately from the client application 11 and from the server application 12, on the company local server 4, to which only the company 15 has access. The agent application 13 is in communication with server application 12.

System application 10 is configured to define and to set the company 15, the user 16 and the position 17. System application 10 is configured to generate encryption and decryption keys accessible to the user 16 and provided for encryption and decryption the documents 19 and the keys themselves.

Specifically, adding and reading the document 19, granting access to the document 19 is done in the client application 11. Specifically, the client application 11 generates a symmetric document key 20 for encryption of the document 19 and user keys 24 for encryption and decryption of the keys accessible for the specific user 16. Each user 16 has an unique pair of asymmetric user keys 24, namely user public key 25 and user private key 26. The client application 11 generates user keys 24 using the JS library at the moment the user 16 first logs into the system. After generating user keys 24, the user private key 26 is encrypted with the help of the other key derived from the user's account password, namely with PBKDF2. The user private key 26 can only be decrypted by the user password. In case of changing or restoring the password, the user keys 24 are re-created and to record them, the same actions are performed, as described here for original user keys 24. On each new device, after logging of the user 16 into the system, and when accessing the company's data, the user 16 is additionally asked for the user password, based on which the user private key 26 was encrypted, to decrypt the user private key 26.

Each position 17 has a unique pair of asymmetric position keys 21, namely position public key 22 and position private key 23. The position private key 23 is encrypted with the user public key 25 and transmitted to the user 16 when needed.

The document key 20 is encrypted with the position public key 22. The position private key 23 is encrypted with the user public key 25 by client application 11. The encrypted document key 20, the user public key 25, the encrypted user private key 26, the position public key 22 and the encrypted position private key 23 are stored on the system server 1.

Each document 19 is stored on the system server 1 encrypted with the document key 20 and is transmittable to the user devices 2 in encrypted form to be decrypted by document key 20 and made accessible to the user 16. The document key 20 and the position private key 23 are transmittable from the system server 1 to the user 16 in encrypted form, to decrypt the position private key 23 with user private key 26, then to decrypt the document key 20 with position private key 23 and finally to decrypt document 19 with document key 20.

The agent application 13 generates a pair of asymmetric agent keys 28, namely agent public key 29 and agent private key 30 for encryption of data. The agent private key 30 is accessible on the company local server 4 only.

The agent application 13 is configured to encrypt the each unencrypted document 19, stored on the system server 1, with document key 20 and to encrypt the document key 20 with agent public key 29. Company administrators have grants to enable or disable of encryption of each unencrypted document, so called company data encryption. When enabling, server application 12 stops processing of all requests for that company 15 and agent application 13 starts to encrypt data. After the encryption process is finished, users 16 may have access in the application. The same process starts when the company administrator disables the encryption.

The agent application 13 is configured to decrypt the position private key 23, encrypted with agent public key 29 and stored on the system server 1, with the agent private key 30 and to encrypt the decrypted position private key 23 with user public key 25 for the specific position 17.

The agent application 13 is configured to decrypt the document key 20, encrypted with the agent public key 29 and stored on the system server 1, with the agent private key 30, to encrypt the decrypted document key 20 with the position public key 22 to provide to the position 17 the access to the document key 20 and to the encrypted document 19.

The agent application 13 is configured to generate new position key 21.

When a new user 16 is assigned to the position 17, the agent application 13 is configured to decrypt the position private key 23 with the agent private key 30 and encrypt the position private key 23 with the user public key 25 to transfer it to the user 16.

When access to the document 19 is granted to the position 17, the agent application 13 distributes the access permissions. The document key 20, encrypted with the agent public key 29, is sent to the agent application 13, the agent application 13 decrypts the document key 20 and encrypts it with the position public key 22 for the specified position 17.

The agent application 13 is configured to generate the document 19 preview and to encrypt the generated document 19 preview with document key 20.

The agent application 13 is configured to index the document 19 for full-text search of the document 19.

In case of a change of the user's 16 password, the agent application 13 sends to the user 16 the position private key 23, encrypted with the new user public key 25. The agent application 13 can obtain or provide access to any document 19 only in response to a corresponding request from the server application 12, within the framework of the system's business logic, that is, when the system requires certain actions from the agent application 13. An independent request by the agent application 13 for documents 19 is not provided.

When adding a new user 16, the following steps are realized in the system:

The client application 11 creates the user keys 24.

User private key 26 is encrypted with a password-based key, namely with PBKDF2.

The user public key 25 and encrypted user private key 26 are sent to the server application 12 to be stored system server 1.

The agent application 13 receives a command to generate the position keys 21 for the position 17. The agent application 13 encrypts the position private key 23 with the user public key 25 and transmits the position public key 22 and the encrypted position private key 23 to the server application 12 to be stored on the system server 1.

The prepared position public key 22 and the encrypted position private key 23 are issued to the client application 11, where the position private key 23 is decrypted using the user private key 26.

When adding a new document 19, the following steps are realized in the system:

Client application 11 generates the document key 20.

The document 19 is encrypted with the document key 20.

The document key 20 is encrypted with public keys separately: for the position 17 that created the document 19, for the agent application 13, and for all positions 17, that have access to the document 19.

The encrypted document 19 and its encrypted key(s) are stored on the system server 1.

When adding a new event like a message or a comment, since any event in the system is always a part of the document 19, the document key 20 is used to encrypt the new event.

When adding a new file, since any file in the system is always a part of the document 19, thus, for new file encryption, the document key 20 is used. For each added file special metadata is generated, such as thumbnail, text representation of a file, pdf preview. These operations are done by agent application 13.

To restrict access to the document 19 for a certain position 17, the access record is deleted from the server application 12 along with the corresponding encrypted document key 20 of the position 17 that has lost access to the document 19.

If it is necessary to index the data, the agent application 13 gets the event from server application, requests the necessary documents 19 from the server application 12, decrypts them, generates a text assembly that contains the keywords required for indexing, and creates an index and stores on company local server.

For setting guest access to the document 19, a guest link to the document 19 is created when sending the document 19 to an external receiver, namely contact person. Contact person is an entity similar to the position 17. Agent application 13 generates its user keys 24 and position keys 21 when contact person is created. When the contact person tries to get access to the document 19 its guest link is being verified and then he gets the encrypted document 19 with user keys 24 and position keys 21.

For sending and receiving documents 19 between encrypted companies 15, when companies with active encryption start the communication in the system, they exchange their agent public keys 29. External agent public key 29 is used to encrypt document key 20 when a document 19 is sent to the external company 15. When the document 19 is received, agent application 13 grants access for the internal positions 17 to the document 19.

For implementation of the system JavaScript, .NET, Java, Python and C++ libraries can be used that support RSA and AES encryption algorithm:

Generation of a random encryption key for the document 19. A key of a certain length is generated from random characters to encrypt the document 19.

Encryption of the document with a document key 20. This stage requires the use of the JavaScript, .NET, Java, Python or C++ libraries for symmetric encryption.

Encryption of the document key 20 of the document 19. The RSA algorithm is used to encrypt the document key 20 of the document 19 with the position public key 22.

The system server 1 is realized by Intel Xeon CPU 128 Gb RAM Linux Server, the user device 2 is realized by Intel i5 CPU 8 Gb RAM Windows 10, the company local server 4 is realized by AMD Ryzen 7 CPU 32 Gb RAM Linux Server.

The user-system network 3 is realized by Internet connection and the company-system network 5 is realized by Internet connection.

System uses RSA 2048-bit key pairs for position and agent keys and encrypting and decrypting process. AES 256 bits key size algorithm is used to encrypt and decrypt a document with document key that is a random key of 128 bits.

System is realized by multi-user client-server cloud application. Client application 11 of the system is physically located and runs on the user device 2. Server application 12 is a cloud application of the system, physically located on the system server 1 with which the client application 11 communicates.

In the described embodiment of data encryption system, there are following advantages:

Original architecture, in which there is no communication between the client application 11 and the agent application 13.

Security—private keys are stored and transmitted in the network in an encrypted form.

Fault-tolerance—the user's 16 work and access to the documents 19 do not depend on the agent application 13 state.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

FIGS. 2A-2E show a flowchart of the data encryption method for creating, storing and accessing the documents 19 with using user keys 24, document keys 20, and position keys 21.

Every action in system is done through the step of defining user 16 (step 100) in client application 11 and verifying his authentication and authorization. It also includes the check of company 15 connect grant and defining other grants.

If user 16 doesn't have his user keys 24 generated, as he enters system at first time, client application 11 generates the user keys 24 (step 101), encrypts user private key 26 with derived key from PKBDF2 (step 102) and stores them to system server 1 (step 103).

The step of defining the position 17 of user 16 (step 150) in client application 11 is critical as all the documents 19 accesses are done for positions 17 in company 15. Each company 15 in the system has organization structure settings with all the positions 17 defined. The position 17 is a point of granting document 19 access and other functionality access and business rules. There could be one or more users 16 on a position 17 as it is sometimes in companies 15.

Assigning user 16 to a position 17 (step 151) in client application 11 could be done by company administrator when new user 16 is assigned or by another user 16 himself for his position 17 when he goes to a vacation, for example.

In case it's a new position 17, that does not have encryption position keys 21 generated already, then encryption position keys 21 are generated such as position public key 22 and position private key 23 (step 152) in agent application 13, position private key 23 is encrypted with user public key 25 (step 153), and position public key 22 and encrypted position private key 23 are stored to system server 1 (step 154).

A new document 19 includes document topic, description, document files, and other attributes. After creating new document 19 (step 110) and generating the document key 20 (step 120) in client application 11, the document 19 is encrypted on the client side with generated document key 20 (step 121), which in its turn is encrypted with position public key 22 (step 123), which was previously transmitted from system server 1 to client application 11 (step 122) and are stored on the system server 1 (step 124).

When accessing the encrypted document 19 with its encrypted document key 20 prepared for position 17 of user 16, the encrypted document 19 and encrypted document key 20 are transmitted from the system server 1 to the client application 11 (step 130), the encrypted position private key 23 is transmitted from the system server 1 to the client application 11 (step 140), the document key 20 is decrypted with position private key 23 (step 142) in client application 11 which in turn is decrypted with user private key 26 (step 141) and the document 19 is decrypted with its document key 20 (step 143).

FIGS. 3A-3F shows a flowchart of one embodiment of the data encryption method for creating, storing and accessing the documents with using user keys 24, document keys 20, position keys 21 and agent keys 28. Steps identical to FIGS. 2A-2E and FIGS. 3A-3F are not described again for FIGS. 3A-3F. In contrast to embodiment presented in flowchart of FIGS. 2A-2E, the embodiment according to flowchart of FIGS. 3A-3F uses the agent keys 28, namely agent public key 29 and agent private key 30. The position private key 23 is stored on system server 1 (step 154) encrypted with agent public key 29 (step 153) in agent application 13. In case of request for decrypted position private key 23, it is firstly decrypted with agent private key 30 (step 132) in agent application, then encrypted with user public key 25 (step 133) and after transmitting to the client application 11 (step 140), it is decrypted with user private key 26 (step 141) in client application 11. The advantage is, that the agent application 13 has access to the keys of all positions 17, since it generates them; this allows providing access to position keys 21 centrally at a single point in the agent application 13; the position key management can be performed according to a schedule or other business case, regardless of the connection status of the users; and the operation is not resource intensive.

Before the steps of generating the position keys 21 (step 152) in agent application 13 if agent keys 28 are not generated then agent application 13 generates agent keys 28 (step 160). Agent private key 30 is stored on company local server 4 (step 161) and agent public key 29 is stored on system server (step 162). For each company 15 one agent key 28 pare is created.

When new position keys 21 are generated on agent application 13 (step 152) the position private key 23 is encrypted with agent public key 29 (step 153) and position public key 22 and encrypted position private key 23 are stored on system server 1 (step 154). That step grants access to the position keys 21 to agent application 13.

When accessing the encrypted document 19 with its encrypted document key 20 prepared for position 17 of user 16, the user public key 25 and position private key 23 encrypted with agent public key 29 are firstly transmitted from system server 1 to agent application 13 (step 131), the agent application 13 decrypts position private key 23 with agent private key 30 (step 132) and encrypts position private key 23 with user public key 25 (step 133). Encrypted position private key 23 is then stored on system server 1 (step 134) and transmitted to the client application 11 (step 140) to decryption steps to decrypt position private key 23 with user private key 26 (step 141), document key 20 with position private key 23 (step 142) and document 19 with document key 20 (step 143).

FIGS. 4A-4F show a flowchart of second embodiment the data encryption method for creating, storing and accessing the documents 19 with using user keys 24, document keys 20, position keys 21 and agent keys 28. Steps identical to FIGS. 2A-2E, FIGS. 3A-3F and FIGS. 4A-4F are not described again for FIGS. 4A-4F. In contrast to embodiment presented in flowchart of FIGS. 3A-3F. after encrypting the document 19 with document key 20 (step 121), the document key 20 stored in system server 1 is encrypted not with position public key 22, but with agent public key 29 (step 123). And encrypting the document key 20 with position public key 22 (step 137) is used among the steps for accessing the content of document 19 and is done in agent application 13. The advantage is, that all documents 19 become available to the agent application 13, that agent application 13 can grant access on documents 19 to the position 17 by schedule or by any business logic event.

In case of scheduled position access to the document 19, agent application 13 decrypts document key 20 with agent private key 30 (step 136) and encrypts it with position public key 22 (step 137) and stores it on system server 1 (step 138).

Figure 5:
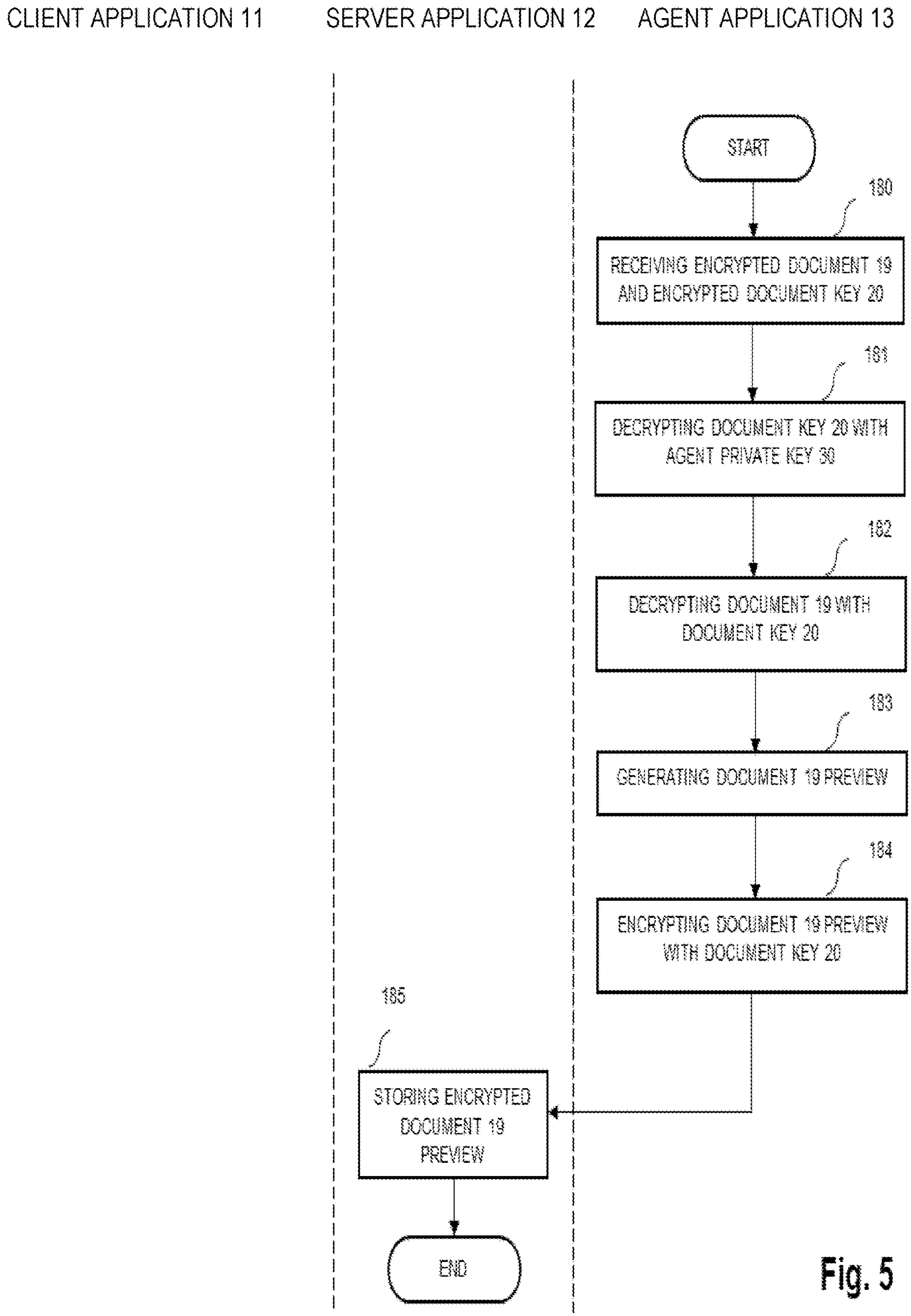
FIG. 5 shows a flowchart of preparing the document preview.

FIG. 5 shows a flowchart of preparing document 19 preview.

In case of adding new document 19, agent application 13 processes the document 19 preview.

Agent application 13 receives the encrypted document 19 and the encrypted document key 20 (step 180), decrypts the document key 20 with the agent private key 30 (step 181) and decrypts the document 19 with decrypted document key 20 (step 182), generates the document 19 preview (step 183), encrypts the document 19 preview with the document key 20 (step 184) and encrypted document 19 preview is stored on the system server 1 (step 185).

Figure 6:
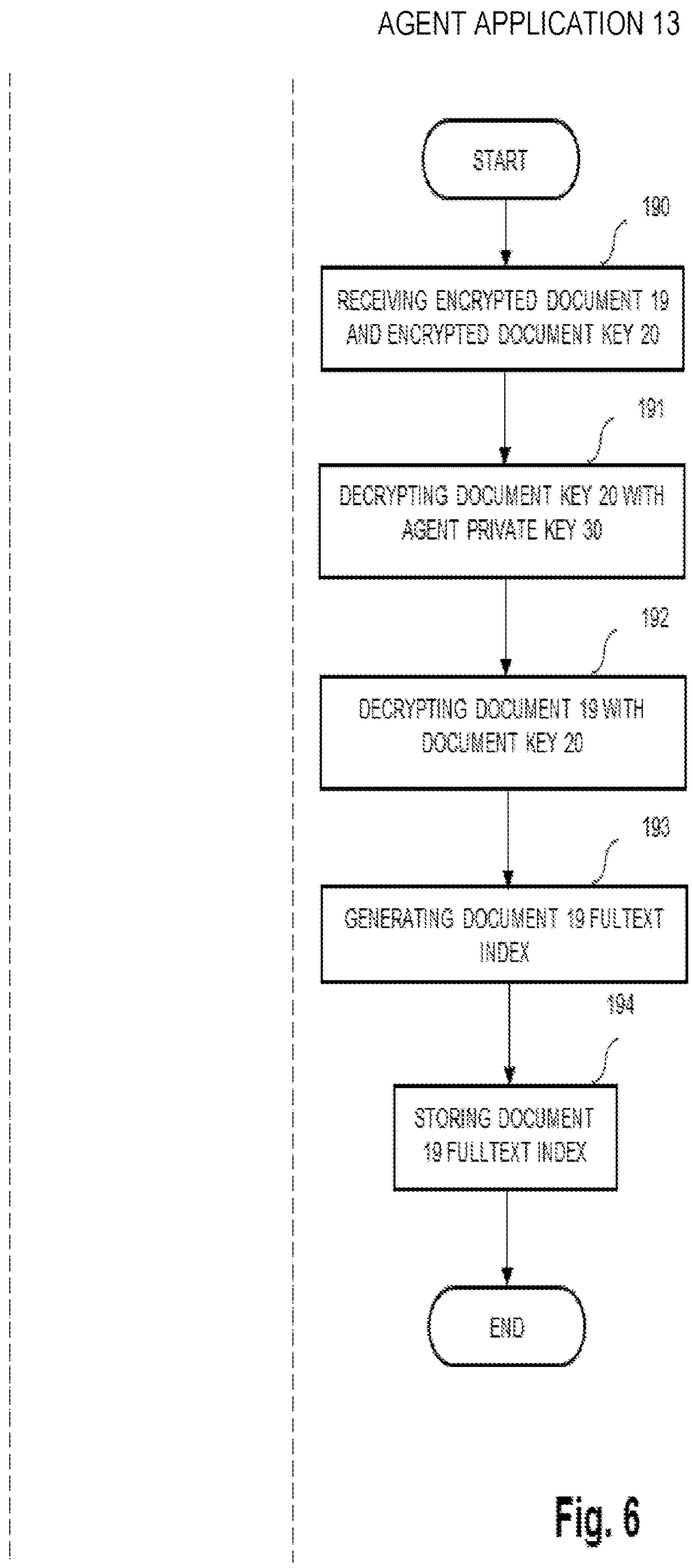
FIG. 6 shows a flowchart of indexing of document.

FIG. 6 shows a flowchart of indexing of document.

In case of adding new document, agent application processes the fulltext index.

Agent application 13 receives the encrypted document 19 and the encrypted document key 20 (step 190), decrypts the document key 20 with agent private key 30 (step 191) and decrypts the document 19 with decrypted document key 20 (step 192), generates the document 19 fulltext index (step 193), which is stored on company local server (step 194).

Symmetric encryption is a type of encryption where one secret key is used to encrypt and decrypt operations for the data. Applications using symmetric encryption must exchange the secret key so that it can be used in the decryption process. Symmetric encryption method differs from asymmetric encryption where a pair of keys public and private are used to encrypt and decrypt the data.

Users of asymmetric encryption application must exchange the public keys, sender encrypts the data with receiver public key and receiver decrypts data with his own private key.

The described system and methods may be implemented involving digital electronic circuitry and using programming or engineering techniques to produce software, firmware, hardware and/or any combination thereof. The invention can be implemented as a computer program product. Software code or logic can be implemented in a medium comprising hardware logic and a computer readable medium. Code in the computer readable medium is accessed and executed by a processor. An application may be e.g. software, a program, executable instructions. A computer program as claimed can be written in any form of programming language. Method steps of the invention can be performed by one or more programmable processors executing a computer program to perform functions of the invention by operating on input data and generating output. To provide interaction with a user, the invention can be implemented on a computer having a display device, for displaying information to the user, and an input device, by which the user can provide input to the computer. The invention can be implemented in a computing system that includes CPU, RAM, Storage device and Network interfaces in a configuration for System server with Intel Xeon CPU 128 Gb RAM Linux Server, for user device 2 is realized by Intel i5 CPU 8 Gb RAM Windows 10 and for company local server AMD Ryzen 7 CPU 32 Gb RAM Linux Server.

LIST OF REFERENCE SIGNS

1 system server
2 user device
3 user-system network
4 company local server
5 company-system network
10 system application
11 client application
12 server application
13 agent application
15 company
16 user
17 position
19 document
20 document key
21 position key
22 position public key
23 position private key
24 user key
25 user public key
26 user private key
28 agent key
29 agent public key
30 agent private key
100 defining user
101 generating user key
102 encrypting the user private key
103 storing user public key and encrypted user private key
110 creating new document

120 generating document key
121 encrypting document with document key
122 transmitting requested position public key
123 encrypting document key
124 storing encrypted document and encrypted document key
125 transmitting requested agent public key
130 transmitting encrypted document and encrypted document key
131 transmitting user public key and the position private key encrypted with agent public key
132 decrypting encrypted position private key with agent private key
133 encrypting position private key with user public key
134 storing position private key encrypted with user public key
135 transmitting position public key and document key encrypted with agent public key
136 decrypting encrypted document key with agent private key
137 encrypting document key with position public key
138 storing the document key encrypted with position public key
140 transmitting encrypted position private key
141 decrypting position private key with user private key
142 decrypting encrypted document key
143 decrypting document with document key
150 defining position
151 assigning user to position
152 generating position keys
153 encrypting position private key
154 storing position public key and encrypted position private key
160 generating agent keys
161 storing agent private key
162 storing agent public key
180 receiving encrypted document and encrypted document key
181 decrypting document key with agent private key
182 decrypting document with document key
183 generating document preview
184 encrypting document preview with document key
185 storing encrypted document preview
190 receiving encrypted document and encrypted document key
191 decrypting document key with agent private key
192 decrypting document with document key
193 generating document fulltext index
194 storing document fulltext index on company local server

The invention claimed is:

1. A data encryption system in a multi-user environment for data access control and end-to-end data encryption comprising:

a system server (1) configured for storing data;

a user device (2) configured for providing the functions of the data encryption system to a user (16); wherein the user is associated to a unique username and password;

user-system network (3) for communication and transmission of the data between the system server (1) and the user device (2);

a system application (10) configured for creating, storing, transferring, reading, changing and searching the data, and for managing the access to the data; the system application (10) comprises:

a client application (11), physically located and running on the user device (2);

a server application (12), physically located and running on the system server (1) and communicating with the client application (11);

the data of the data encryption system comprises documents (19) and encryption and decryption keys;

the system application (10) is configured to define and to set:

a company (15), which is an account in the system application (10), within which the documents (19) are stored and exchanged;

a user account in the data encryption system;

the client application (11) is configured to generate a symmetric document key (20) for encryption of the document (19), the client application (11) is configured to generate user keys (24) for encryption and decryption of the keys accessible for the specific user (16), each user (16) has an unique pair of asymmetric user keys (24), namely user public key (25) and user private key (26), each document (19) is stored on the system server (1) encrypted with the document key (20) and is transmittable to the user device (2) in encrypted form to be decrypted by document key (20) and made accessible to the user (16), the system application (10) is configured to define and to set:

a position (17), which is a unit of the company (15) and a basic unit of the system application (10), on whose behalf all actions with documents (19) are performed;

the user (16) is assignable to the position (17);

access of the user (16) to the document (19) is provided via assigned position (17) only;

each position (17) has a unique pair of asymmetric position keys (21), namely position public key (22) and position private key (23);

the document key (20) is stored on the system server (1) encrypted with the position public key (22) and is transmittable to the user (16) in encrypted form;

the position public key (22) is stored on the system server (1);

the position private key (23) is stored encrypted on the system server (1) and is transmittable to the user (16) in encrypted form, to decrypt the encrypted document key (20), the user private key (26) is encrypted using a key derived from the user's unique password and stored on the system server (1);

each document (19), document key (20), user private key (26) and position private key (23) are transmittable to and from the system server (1) and stored on the system server (1) in encrypted form only, wherein these data in original decrypted form are inaccessible to the system server (1), the system application (10) comprises an agent application (13), located, separately from the client application (11) and from the server application (12), on the company local server (4), to which only the company (15) has access and which is connected to the system server (1) via the company-system network (5), the agent application (13) is in communication with server application (12).

2. The system according to the claim 1, wherein the agent application (13) is configured to generate a pair of asymmetric agent keys (28), namely agent public key (29) and agent private key (30) for encryption of data; the agent private key (30) is accessible on the company local server (4) only; and the agent application (13) is configured to decrypt the position private key (23), encrypted with agent public key (29) and stored on the system server (1), with the agent private key (30) and to encrypt the decrypted position private key (23) with user public key (25) for the specific position (17).

3. The system according to claim 2, wherein the agent application (13) is configured to decrypt the document key (20), encrypted with the agent public key (29) and stored on the system server (1), with the agent private key (30), to encrypt the decrypted document key (20) with the position public key (22) to provide to the position (17) the access to the document key (20) and to the encrypted document (19).

4. The system according to claim 2, wherein the agent application (13) is configured to generate the document (19) preview and to encrypt the generated document (19) preview with document key (20).

5. The system according to claim 2, wherein the agent application (13) is configured to index the document (19) for full-text search of the document (19).

6. The system according to claim 1, wherein the agent application (13) is configured to generate new position key (21), to encrypt the position private key (23) with user public key (25) and to encrypt all the specific document keys (20) with the position public key (22).

7. The system according to the claim 1, wherein the position private key (23) is encrypted with the user public key (25).

8. A computer-implemented data encryption method performed by the system according to claim 1, comprising:

defining (100) a user (16), wherein the user is associated to a unique username and password;

generating (101) user key (24), by the client application (11), for each user (16), as a pair of asymmetric user keys (24), namely user public key (25) and user private key (26), encrypting (102) the user private key (26) wherein the user private key (26) is encrypted using a key derived from the user's unique password, and storing (103) the user public key (25) and the encrypted user private key (26) by the server application (12) on the system server (1);

creating (110) a new document (19), by the client application (11);

generating (120) the document key (20), by the client application (11), as a symmetric document key (20), for the created document (19), encrypting (121) the document (19) with document key (20), encrypting (123) the document key (20), storing (124) the encrypted document (19) and the encrypted document key (20) by the server application (12) on the system server (1);

accessing the content of the document (19) to the user (16), through transmitting (130) the encrypted document (19) and the encrypted document key (20) by the server application (12) from the system server (1) to the client application (11), transmitting (140) the decryption key to the user (16) for decrypting (142) the encrypted document key (20) in the client application (11), decrypting (143) the document (19) with the decrypted document key (20);

wherein before the step of creating (110) a new document (19), there are the steps of defining (150) a position (17), assigning (151) user (16) to position (17), generating (152) the position key (21), for each position (17), as a pair of asymmetric position keys (21), namely position public key (22) and position private key (23), encrypting (153) the position private key (23), and storing (154) the position public key (22) and the encrypted position private key (23) by the server application (12) on the system server (1);

in the step of encrypting (123) the document key (20), the document key (20) is encrypted with position public key (22), for the position (17) which has access to the document (19), in the step of transmitting (140) the decryption key to the user (16), the transmitted decryption key is the position private key (23) encrypted with the user public key (25), to be decrypted (141) with user private key (26) by the client application (11) and to provide the user (16) the access to the position private key (23) accessible to the position (17) assigned to the user (16).

9. A computer-implemented data encryption method according to the claim 8, wherein in the step encrypting (153) the position private key (23), the position private key (23) is encrypted with the user public key (25), for the user (16) assigned to the position (17).

10. A computer-implemented data encryption method according to the claim 8, wherein the position key (21) is generated (152) by the agent application (13);

before the step of generating (152) the position key (21), there are the steps of generating (160) the agent key (28), by the agent application (13) located on the company local server (4) separately from the client application (11) and from the server application (12), as a pair of asymmetric agent keys (28), namely agent public key (29) and agent private key (30), and storing (161) the agent private key (30) on the company local server (4) and storing (162) the agent public key (29) on the system server (1);

in the step encrypting (153) the position private key (23), the position private key (23) is encrypted with the agent public key (29), by the agent application (11);

before the step transmitting (140) the encrypted position private key (23) to the user (16), there are the steps of transmitting (131) the user public key (25) and the position private key (23) encrypted with agent public key (29) to the agent application (13), decrypting (132) the encrypted position private key (23) with agent private key (30), by the agent application (13), encrypting (133) the position private key (23) with user public key (25), for the user (16) assigned to the position (17), by the agent application (13), and storing (134) the position private key (23) encrypted with user public key (25) to the system server (1).

11. A computer-implemented data encryption method according to the claim 10, wherein in the step of encrypting (123) the document key (20), the document key (20) is encrypted with agent public key (29), by the client application (11);

before the step of transmitting (130) the encrypted document (19) and the encrypted document key (20), there are the steps of transmitting (135) the position public key (22) and the document key (20) encrypted with agent public key (29) to the agent application (13), decrypting (136) the encrypted document key (20) with agent private key (30), by the agent application (13), encrypting (137) the document key (20) with position public key (22), by the agent application (13), and storing (138) the document key (20) encrypted with position public key (22) on the system server (1).

12. A computer-implemented data encryption method according to claim 10, wherein the agent application (13) provides following steps:

receiving (180) the encrypted document (19) and the encrypted document key (20), decrypting (181) the document key (20) with the agent private key (30), decrypting (182) the document (19) with the document key (20), generating (183) the document (19) preview, encrypting (184) the document (19) preview with the document key (20), storing (185) the encrypted document (19) preview on the system server (1).

13. A computer-implemented data encryption method according to claim 10, wherein the agent application (13) provides following steps:

receiving (190) the encrypted document (19) and the encrypted document key (20), decrypting (191) the document key (20) with agent private key (30), decrypting (192) the document (19) with document key (20), generating (193) the document (19) fulltext index, storing (194) the document (19) fulltext index on the company local server (4).

* * * * *